US012810037B2

(12) United States Patent
Presse, IV et al.

(10) Patent No.: US 12,810,037 B2
(45) Date of Patent: Nov. 24, 2026

(54) GOLF CLUB AND SYSTEM AND METHOD FOR MAKING THE SAME

(71) Applicant: L.A.B. Golf Company LLC, Creswell, OR (US)

(72) Inventors: Bill Presse, IV, Reno, NV (US); George Pantazelos, Park City, UT (US); Joseph K. Lane, Branford, CT (US)

(73) Assignee: L.A.B. Golf Company LLC, Eugene, OR (US)

( * ) Notice: Subject to any disclaimer, the term of this patent is extended or adjusted under 35 U.S.C. 154(b) by 523 days.

(21) Appl. No.: 18/354,905

(22) Filed: Jul. 19, 2023

(65) Prior Publication Data

US 2024/0028786 A1 Jan. 25, 2024

Related U.S. Application Data

(60) Provisional application No. 63/492,601, filed on Mar. 28, 2023, provisional application No. 63/368,820, filed on Jul. 19, 2022.

(51) Int. Cl.
*G06F 30/17* (2020.01)
*A63B 53/08* (2015.01)
(Continued)

(52) U.S. Cl.
CPC .............. *G06F 30/17* (2020.01); *A63B 53/08* (2013.01); *A63B 2102/32* (2015.10); *B33Y 10/00* (2014.12); *G06F 2111/16* (2020.01)

(58) Field of Classification Search
CPC ................. G06F 30/17; G06F 2111/16; A63B 2053/0491; A63B 53/007; A63B 53/08; A63B 2102/32; B33Y 10/00
See application file for complete search history.

(56) References Cited

U.S. PATENT DOCUMENTS 807,224 A 12/1905 Vaile
1,631,504 A 6/1927 Redman
(Continued)

FOREIGN PATENT DOCUMENTS

GB 727051 A 3/1955
GB 2362832 A 12/2001
(Continued)

OTHER PUBLICATIONS

Extended European Search Report (EESR) for EP Application No. EP 14785657, dated Nov. 15, 2016.
(Continued)

*Primary Examiner* — Steve Rowland
(74) *Attorney, Agent, or Firm* — Manatt, Phelps & Phillips, LLP

(57) ABSTRACT

A balanced golf club and method and system for making are disclosed. Input data describing a golfer's club swing path, his/her physical features, and/or an initial golf putter design are used in determining a torque about a shaft central axis for the initial golf putter design. In some embodiments, the initial golf club design is iteratively modified to provide a plurality of modified golf club designs, and the torques for the initial and modified golf putter designs are compared to determine a golf club design having a minimum and/or predetermined torque. The golf club design is used to manufacture the balanced golf club and so the invention encompasses such clubs as well.

37 Claims, 28 Drawing Sheets

(51) Int. Cl.

| | |
|---|---|
| *A63B 102/32* | (2015.01) |
| *B33Y 10/00* | (2015.01) |
| *G06F 111/16* | (2020.01) |

(56) References Cited

U.S. PATENT DOCUMENTS 1,703,199 A 2/1929 Mcclure
2,425,808 A 8/1947 Jakosky
2,820,638 A 1/1958 Morrison
2,843,384 A 7/1958 Schmidt
3,319,962 A 5/1967 Summers
3,459,426 A 8/1969 Sherwood
3,486,755 A 12/1969 Hodge
3,572,709 A 3/1971 Risher
3,574,349 A 4/1971 Kropp
3,625,517 A 12/1971 Durnack
3,655,188 A 4/1972 Solheim
3,679,207 A 7/1972 Florian
3,758,115 A 9/1973 Hoglund
3,762,717 A 10/1973 Johnston
3,954,265 A 5/1976 Taylor
4,010,958 A 3/1977 Long
4,058,312 A 11/1977 Stuff et al.
4,063,733 A 12/1977 Benedict
4,138,117 A 2/1979 Dalton
4,141,556 A 2/1979 Paulin
4,163,554 A 8/1979 Bernhardt
4,240,636 A 12/1980 Swenson
4,269,412 A 5/1981 Hughes
4,310,158 A 1/1982 Hoffman
4,312,509 A 1/1982 Grant
4,324,404 A 4/1982 Dian
4,325,553 A 4/1982 Taylor
4,374,315 A * 2/1983 Timbrook .............. B21D 53/00 228/173.6
4,426,083 A 1/1984 Dishner, Jr.
4,746,120 A 5/1988 Mockovak
4,921,253 A 5/1990 Tesori
4,986,544 A 1/1991 Benson
5,078,398 A 1/1992 Reed et al.
5,133,555 A 7/1992 Bailey
5,160,141 A 11/1992 Crews
5,228,332 A 7/1993 Bernhardt
5,290,035 A 3/1994 Hannon
5,308,068 A 5/1994 Strand
5,333,863 A 8/1994 Shenoha et al.
5,409,220 A 4/1995 Lombardo
5,454,564 A 10/1995 Kronogard
5,460,372 A 10/1995 Cook
5,469,627 A * 11/1995 Denny ................... A63B 60/42 33/508
5,470,070 A 11/1995 Bendo
5,544,879 A 8/1996 Collins
5,551,696 A 9/1996 Izett et al.
5,571,052 A 11/1996 Bolanos
5,588,920 A 12/1996 Soong
5,620,379 A 4/1997 Borys
5,624,329 A 4/1997 Schneebeli
5,662,532 A 9/1997 Mizumura
5,700,207 A 12/1997 Guthrie et al.
5,728,009 A 3/1998 Shanahan
5,749,792 A 5/1998 Engfer et al.
5,782,705 A 7/1998 Solari
5,785,608 A 7/1998 Collins
5,830,075 A 11/1998 Hirose
5,830,082 A 11/1998 White
6,083,115 A 7/2000 King
6,083,123 A * 7/2000 Wood ................. A63B 69/3605 473/409
6,152,832 A 11/2000 Chandler, III
6,350,208 B1 2/2002 Ford
6,506,128 B1 1/2003 Bloom, Jr.
6,634,956 B1 10/2003 Pegg
6,663,499 B2 12/2003 Riseley
6,786,835 B1 9/2004 Carter
6,966,846 B2 11/2005 Bloom, Jr.
6,988,959 B2 1/2006 Pollman
7,066,829 B1 6/2006 Lister
7,121,954 B2 10/2006 Charron et al.
7,125,341 B1 10/2006 D'Eath
7,306,526 B2 12/2007 Baek
7,407,445 B2 8/2008 Pedraza et al.
7,494,422 B2 2/2009 Pegg
7,524,247 B2 4/2009 Williams
7,635,310 B2 * 12/2009 Keough ................. A63B 60/24 473/297
7,691,004 B1 * 4/2010 Lueders ............. A63B 69/3685 473/223
8,096,893 B2 1/2012 Ferris
8,734,266 B2 5/2014 David
8,858,356 B2 10/2014 Chu et al.
8,932,148 B2 1/2015 Presse, IV et al.
9,017,183 B1 4/2015 Ambrose
9,044,655 B1 6/2015 Hanson
9,233,280 B2 1/2016 Presse, IV et al.
9,415,291 B2 * 8/2016 Ota .................... A63B 69/3632
9,421,439 B2 8/2016 Mcloughlin
10,052,536 B1 8/2018 Janus
10,682,557 B2 6/2020 Ambrose
11,628,347 B2 4/2023 Ambrose
2002/0032074 A1 3/2002 Grieb
2002/0077191 A1 6/2002 Roelke
2002/0098905 A1 7/2002 Riseley
2002/0151376 A1 10/2002 Verne
2003/0046988 A1 3/2003 Yamaguchi et al.
2003/0064822 A1 4/2003 Arvidson
2003/0130058 A1 7/2003 Ferris
2003/0162599 A1 8/2003 Klein
2003/0186755 A1 10/2003 Kitabayashi
2003/0199332 A1 10/2003 Lindsay
2003/0211900 A1 11/2003 Novak et al.
2003/0220149 A1 11/2003 Mills
2003/0228926 A1 12/2003 Wang
2003/0236128 A1 12/2003 Jackson
2004/0259655 A1 12/2004 Ferris
2005/0020381 A1 1/2005 Yamaguchi et al.
2005/0049066 A1 3/2005 Schweigert
2005/0049076 A1 3/2005 Schweigert et al.
2005/0137028 A1 * 6/2005 Lukasiewicz, Jr. .......................... A63B 53/0487 473/340
2005/0215348 A1 9/2005 Baek
2005/0239573 A1 * 10/2005 Moriyama ......... A63B 53/0487 473/340
2006/0009305 A1 1/2006 Lindsay
2006/0068929 A1 3/2006 Goldfader
2006/0142094 A1 6/2006 McCracken
2006/0156514 A1 7/2006 Lewis
2006/0199663 A1 9/2006 Lister
2006/0264264 A1 11/2006 Sandino
2006/0281578 A1 12/2006 Pedraza
2006/0287130 A1 12/2006 Allen
2007/0026959 A1 2/2007 Boone
2008/0058115 A1 3/2008 Bengtson
2008/0293513 A1 11/2008 Bitko et al.
2008/0305880 A1 12/2008 Brown
2008/0305885 A1 12/2008 Kinney
2009/0017936 A1 1/2009 Sato et al.
2009/0069110 A1 * 3/2009 Schmidt ................. A63B 53/02 473/313
2009/0186718 A1 7/2009 Ross
2009/0227387 A1 9/2009 Pontius
2009/0247315 A1 10/2009 Kossowsky
2010/0083518 A1 * 4/2010 Kramski ............ A63B 69/3667 33/508
2010/0160062 A1 6/2010 Teramoto
2010/0160075 A1 * 6/2010 Dawson ............. A63B 53/0466 473/349
2010/0298065 A1 11/2010 Soracco et al.
2011/0065525 A1 3/2011 Johnson
2011/0086731 A1 4/2011 Todd
2011/0183773 A1 7/2011 Cameron
2011/0294592 A1 12/2011 Guerriero

(56) References Cited

U.S. PATENT DOCUMENTS

| | | | |
|---|---|---|---|
| 2012/0034990 | A1 | 2/2012 | Cohen et al. |
| 2012/0196696 | A1 | 8/2012 | Guerriero |
| 2012/0214610 | A1 | 8/2012 | Parsons |
| 2012/0283034 | A1 | 11/2012 | Morton |
| 2013/0130825 | A1 | 5/2013 | McLoughlin |
| 2013/0203514 | A1 | 8/2013 | Chu |
| 2013/0210539 | A1 | 8/2013 | Baumann |
| 2013/0225306 | A1 | 8/2013 | David |
| 2013/0331197 | A1 | 12/2013 | Hackenberg |
| 2014/0045602 | A1 | 2/2014 | Dingman |
| 2014/0148267 | A1 | 5/2014 | Pitbladdo |
| 2014/0200097 | A1 | 7/2014 | Chu et al. |
| 2014/0213385 | A1 | 7/2014 | Chu et al. |
| 2014/0315655 | A1 | 10/2014 | Presse, IV et al. |
| 2014/0315656 | A1 | 10/2014 | Presse, IV et al. |
| 2014/0349775 | A1 | 11/2014 | Davis |
| 2015/0045135 | A1 | 2/2015 | Patel |
| 2015/0182823 | A1 | 7/2015 | Hsu |
| 2015/0196813 | A1 | 7/2015 | Chu et al. |
| 2015/0209626 | A1 | 7/2015 | Klein et al. |
| 2015/0251064 | A1 | 9/2015 | Chapin |
| 2015/0258390 | A1 | 9/2015 | Defrancesco, Jr. |
| 2015/0265890 | A1 | 9/2015 | Presse, IV et al. |
| 2015/0367174 | A1* | 12/2015 | Okazaki .................. A61B 5/11 473/226 |
| 2016/0082329 | A1* | 3/2016 | Kammerer ........... A63B 53/007 473/297 |
| 2016/0096087 | A1 | 4/2016 | Sussich |
| 2016/0107052 | A1 | 4/2016 | Wang et al. |
| 2016/0175665 | A1 | 6/2016 | Presse, IV et al. |
| 2016/0339310 | A1 | 11/2016 | Goldfader |
| 2017/0087430 | A1 | 3/2017 | Ambrose |
| 2017/0225046 | A1 | 8/2017 | Foster |
| 2018/0021635 | A1 | 1/2018 | Lewis |
| 2018/0290033 | A1 | 10/2018 | Rife |
| 2020/0298057 | A1* | 9/2020 | Wycoff .................. G06V 40/23 |
| 2021/0077883 | A1 | 3/2021 | Irvin |
| 2021/0154550 | A1* | 5/2021 | Presby ............... A63B 69/3632 |
| 2022/0288469 | A1* | 9/2022 | Liu .......................... C21D 1/34 |
| 2023/0191208 | A1 | 6/2023 | Presse, IV et al. |
| 2023/0233914 | A1 | 7/2023 | Cameron |
| 2025/0018260 | A1 | 1/2025 | Wilson |
| 2025/0032869 | A1 | 1/2025 | Cavill |
| 2025/0099819 | A1 | 3/2025 | Sood |

FOREIGN PATENT DOCUMENTS

| | | | |
|---|---|---|---|
| WO | 9217247 | A1 | 10/1992 |
| WO | 2007023693 | A1 | 3/2007 |
| WO | 2009005439 | A1 | 1/2009 |
| WO | 2012010609 | A1 | 1/2012 |

OTHER PUBLICATIONS

International Search Report (ISR) for PCT Application No. PCT/IB2014/060782, dated Aug. 21, 2014.

* cited by examiner

GOLF CLUB AND SYSTEM AND METHOD FOR MAKING THE SAME

CROSS-REFERENCE TO RELATED APPLICATIONS

This application claims priority to U.S. Provisional Application No. 63/368,820, titled "Dynamically Balanced Golf Putter and Method of Making," filed on Jul. 19, 2022, and to U.S. Provisional Application No. 63/492,601, titled "Dynamically Balanced Golf Putter and Method of Making," filed on Mar. 28, 2023, which are hereby incorporated by reference.

TECHNICAL FIELD

This application relates generally to the design and manufacture of golf clubs.

BACKGROUND

Torque in a golf club such as a golf putter is caused by a force being applied to one or more parts of the putter off-line from the putter's axis of rotation. Those skilled in the art understand that torque is a product of the magnitude of applied force and the off-axial distance at which the force is applied, which is often written as $t=r \times F$ where t is the torque, r is the off-axial distance and F is the applied force. Technically, this is a vector relationship where each of t, r and F have both a magnitude and a vector orientation or direction, but the relationship is also true if taken in the scalar (magnitude) sense only.

FIGS. 1A-1C illustrate cross sections of a golf putter shaft 10 (considered simplistically in this example as an elongated cylinder) according to the prior art. A force 101 (F) may be applied to the shaft 10 and the resulting torque achieved thereby as understood by those skilled in the art. Torque can be experienced or felt in the form of a turning or twisting effort for example affecting the player's grip on a golf putter during play. In FIG. 1A, a force 101 is applied at an effective point 104 corresponding to a radial (r) offset distance 103 from the axial center 100 of the shaft 10, producing a torque (conventionally directed into the plane of the drawing page) tending to twist 102 the shaft 10 in a clockwise manner about its axial center 100. In FIG. 1B, the force 101 is applied in a different direction and at a different radial offset 103, which produces a torque (conventionally directed out of the plane of the drawing page) tending to twist 102 the shaft 10 counterclockwise. In FIG. 1C, no rotational torque is developed because the applied force 101 is directed at the axial center 100 so there is zero (no) radial distance or offset 103 from the axis of rotation, i.e., r=0.

The effect of torque in the context of using a golf putter is that traditional putters will experience net forces and torques with respect to the axis of rotation of the putter during play. A resulting twist or torque is felt by the player during a swing through the grip of the putter (handle), and there is a corresponding dynamic force felt by the player and which acts to rotate the putter in the player's hands so that the putter club face twists or tends to rotate about the shaft axis from its normal at-rest orientation (where the face of the putter is normal to the intended direction of swing at the time of impact between the club face and the golf ball). In actual play, there may be several torque components and forces involved, working about several axes of rotation of the three-dimensional putter.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

In the present disclosure and claims, a golf club is generally meant to encompass a variety of golfing clubs such as and as sometimes referred to as clubs, irons, woods, drivers, chippers, wedges or otherwise used by a player to strike a golf ball. Likewise, where reference to a putter or an exemplary club is made herein, those skilled in the art will appreciate that the reference can be applied to a variety of golf club types unless indicated otherwise, and as such the disclosure is intended to cover all such implements of the game.

An embodiment is directed to a method for manufacturing a custom dynamically balanced golf putter, comprising receiving, in a computer, first input data describing a putter swing path of a golf player; receiving, in the computer, second input data describing one or more physical features of the golf player; receiving, in the computer, third input data describing an initial golf putter design; determining, with the computer, an initial integrated torque about a shaft central axis for the initial golf putter design using the first, second, and third input data, the initial integrated torque integrated over the putter swing path of the golf player; iteratively modifying, with the computer, the initial golf putter design to provide a plurality of modified golf putter designs; determining, with the computer, modified integrated torques about the shaft central axis for respective modified golf putter designs, each modified integrated torque integrated over the putter swing path of the golf player; comparing, with the computer, the initial integrated torque and the respective modified integrated torques to determine a custom golf putter design having a minimum integrated torque; and manufacturing the custom dynamically balanced golf putter using the custom golf putter design.

An embodiment is directed to a system for manufacturing a custom dynamically balanced golf putter, comprising a computer having a microprocessor and non-transitory memory operatively coupled to the microprocessor, the non-transitory memory storing computer-readable instructions that, when executed by the microprocessor, cause the microprocessor to determine an initial integrated torque about a shaft central axis for an initial golf putter design using the first, second, and third input data, the initial integrated torque integrated over the putter swing path of the golf player, wherein the first input data describes a putter swing path of a golf player; the second input data describes one or more physical features of the golf player; the third input data describes the initial golf putter design; iteratively modify the initial golf putter design to provide a plurality of modified golf putter designs; determine modified integrated torques about the shaft central axis for respective modified golf putter designs, each modified integrated torque integrated over the putter swing path of the golf player; and compare the initial integrated torque and the respective modified integrated torques to determine a custom golf putter design having a minimum integrated torque; and a computer numerical control (CNC) machining tool in electrical communication with the computer, the CNC machining tool configured to automatically manufacture at least a component of the custom dynamically balanced golf putter using at least a portion of the custom golf putter design.

An embodiment is directed to a dynamically balanced golf club designed, optimized and/or manufactured using the foregoing method.

An embodiment is directed to a dynamically balanced golf club designed, optimized and/or manufactured using the foregoing system.

Therefore, a custom balanced golf club and method and system for making are disclosed. Input data describing a golfer's club swing path, his/her physical features, and an initial golf putter design are used to determining an integrated torque about a shaft central axis for the initial golf putter design. The initial golf club design is iteratively modified to provide a plurality of modified golf club designs. The integrated torque for each modified golf club design is determined. The integrated torques for the initial and modified golf putter designs are compared to determine a custom golf club design having a minimum integrated torque. The custom golf club design is used to manufacture the custom dynamically balanced golf club and so the invention encompasses such clubs as well.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

A golfing club as well as a method and system for designing and manufacturing the same are provided herein. In some embodiments, a custom dynamically balanced golf putter is disclosed.

A method includes receiving, in a computer, first input data describing a putter swing path of a golf player, second input data describing one or more physical features of the golf player, and third input data describing an initial golf putter design. The computer uses the first, second, and third input data to determine an initial integrated torque about a shaft central axis for the initial golf putter design. The initial integrated torque is integrated over the putter swing path of the golf player. The computer iteratively modifies the initial golf putter design to provide a plurality of modified golf putter designs. The computer determines a modified integrated torque about the shaft central axis for each modified golf putter design The computer compares the initial integrated torque and the respective modified integrated torques to determine a custom golf putter design having a minimum integrated torque. The custom golf putter design is used to manufacture the custom dynamically balanced golf putter.

A torque balanced putter or dynamically balanced putter would not require the player to apply a twisting force to rotate the head. Instead, the translational forces cause a rotation that matches the rotation of the swing arc.

Figure 1A:
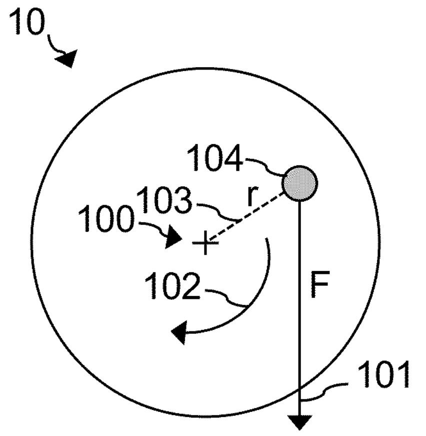
FIGS. 1A-C illustrate cross sections of a golf putter shaft according to the prior art.
Figure 1B:
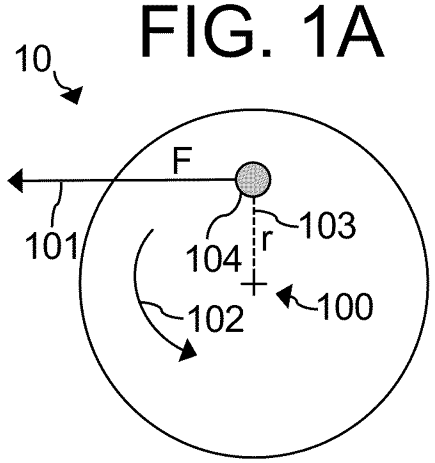
Figure 1C:
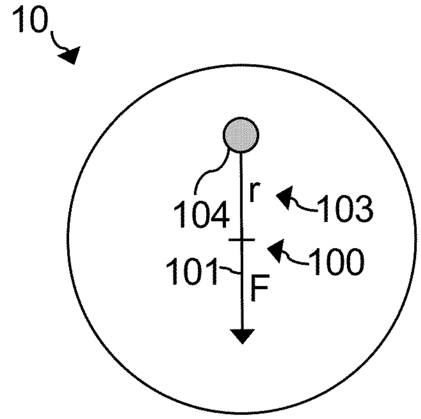
Figure 2:
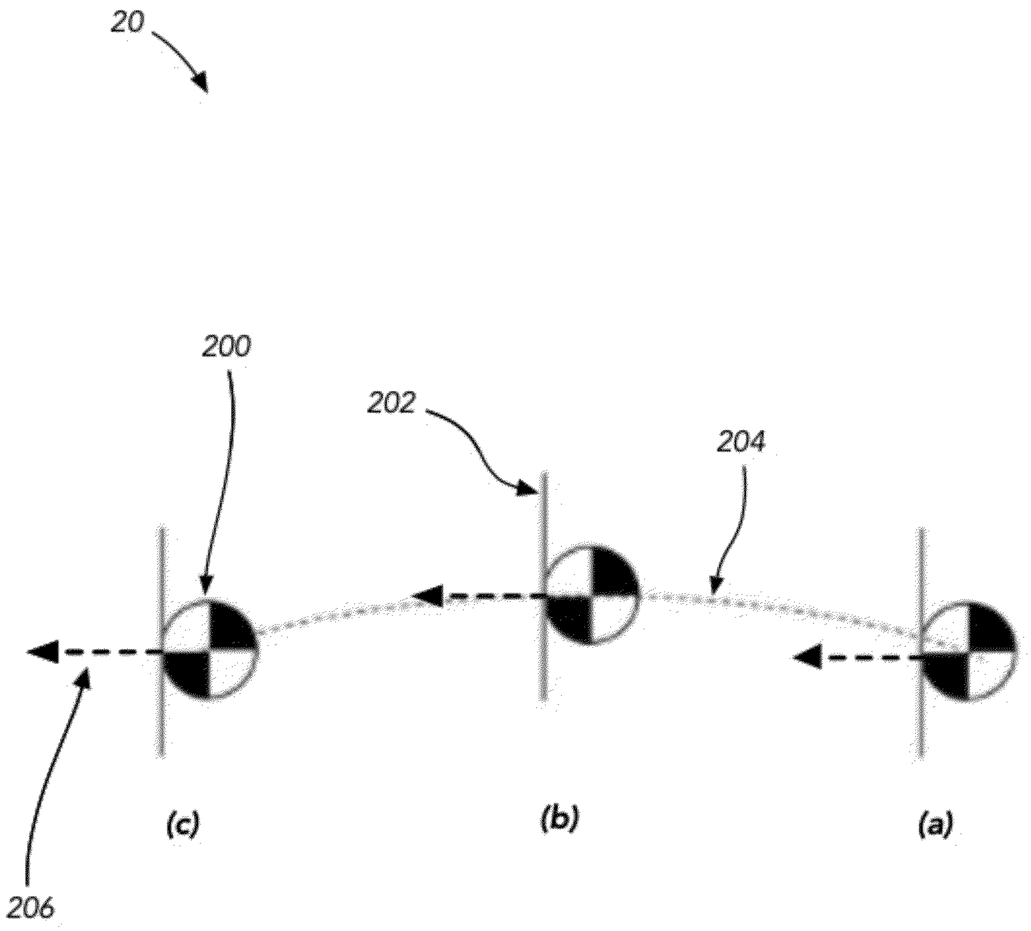
FIG. 2 illustrates a cross-sectional view of a simplified cylindrical putter shaft at three snapshots in time.

FIG. 2 illustrates a cross-sectional view 20 of a simplified cylindrical putter shaft 200 at three snapshots in time (a), (b), (c) as it moves through a trajectory 204, with club face 202 lying in or depicting the plane of the club face of the putter. Consider a force that is in-line with an axis of rotation of an elongated putter. As the force is not offset laterally or radially from the axis of rotation, the object will only translate in position and will not rotate about the axis of the shaft because there is no torque about this axis. A simple instance of this condition is if a straight shaft putter (with a simple elongated cylindrical shaft) connects directly to the center of gravity of the putter head. A tangential force would move the putter along the swing trajectory, but the face would stay pointing in the same orientation. That is, a normal vector 206 with respect to the flat putter club face 202 would remain directed in the same direction during the swing. Cross-sectional views 30 of a putter experiencing rotational torque is depicted in FIG. 3, where views 30 at times (a), (b), and (c) show an inward centripetal force 300 as well.

Figure 3:
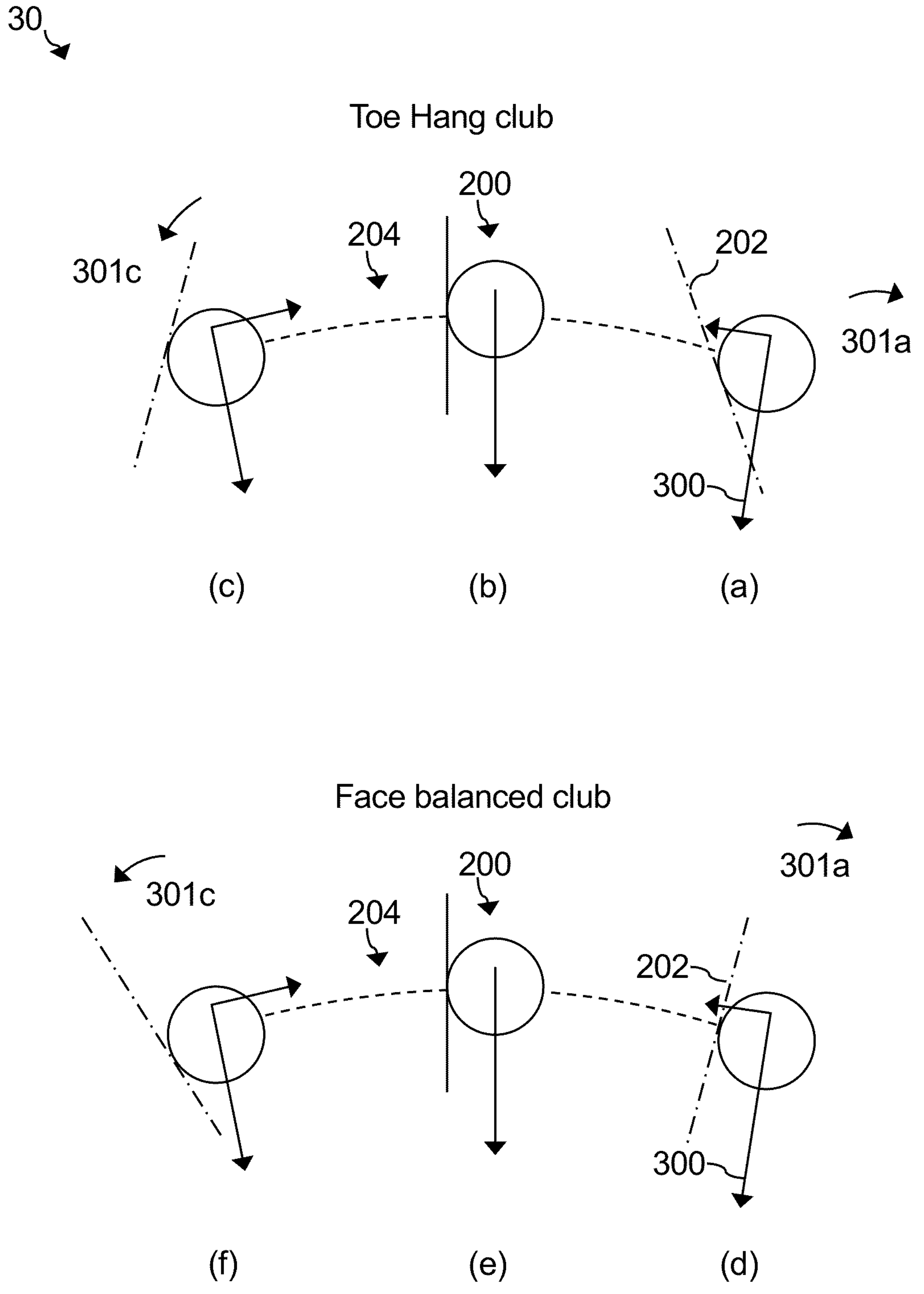
FIG. 3 illustrates a cross-sectional view of a simplified cylindrical putter shaft at three snapshots in time while rotational torque is applied for two types of club designs.

Referring to FIG. 3 (*a*)-(*c*), depicting a toe-hang putter or club design, ignoring the swing tempo and gravity, if the putter started square, the club face 202 would close on the back swing (a) showing the backswing (head closing) and opens on the forward swing (c) with a neutral condition in between (b). In order to conduct a proper stroke, the player must rotate the putter's head appropriately, with the hands applying a torque (or counter-torque depending on perspective) to twist the putter square to the stroke. The small curved arrows 301*a* and 301*c* represent torques applied to the player's hands, who has to counter this torque in the example of a toe-hang club or putter. FIG. 3 (*d*)-(*f*) depict a similar sequence for a face-balanced club.

Figure 4:
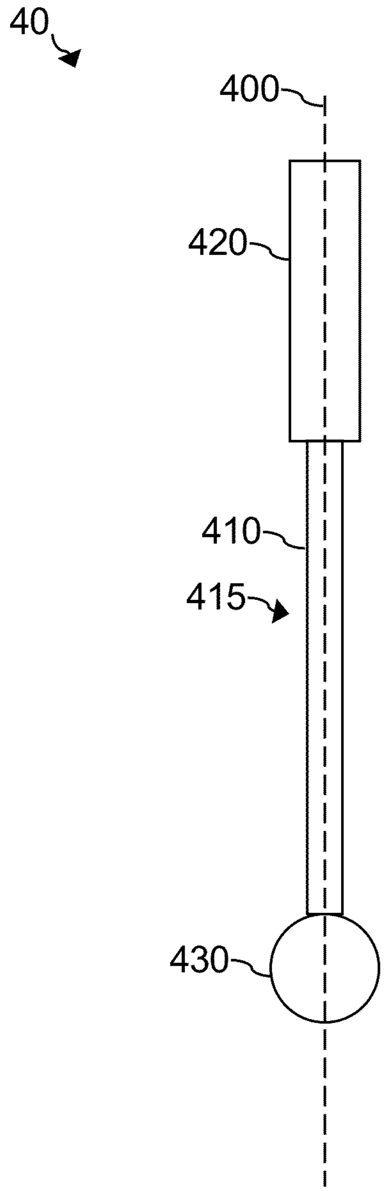
FIG. 4 is a simplified side view of a golf putter according to an embodiment.

For the present purpose, the torque axis 400 passes through and is coaxial with the axial center axis 415 of the cylindrical shaft 410 of the putter 40 and whereby it passes through the player's hands which are placed on the grip 420, as illustrated in FIG. 4. The putter head 430 is attached to the shaft 410 and is illustrated simplistically. In other words, the axis from which we measure distance for the purpose of the present discussion of torque is the axis 400 that connects the hands of the player to the rest of the putter shaft 410.

We now discuss some of the forces in play during a putting motion. The force of a swing acts on the putter's center of gravity (Cg). The Cg is based on the distribution of the elements of mass forming the object and describes the point at which the object acts in response to the force of gravity on the object. These forces are present over the entire duration of the swing. There is also an impulse force when the putter hits the golf ball and transfer of energy and momentum occurs from the putter (club face) to the ball as expected. Newton's laws (to first order) determine the interaction of the putter and the ball and their subsequent motion. For the present purposes, we consider the swing forces only.

Figure 5A:
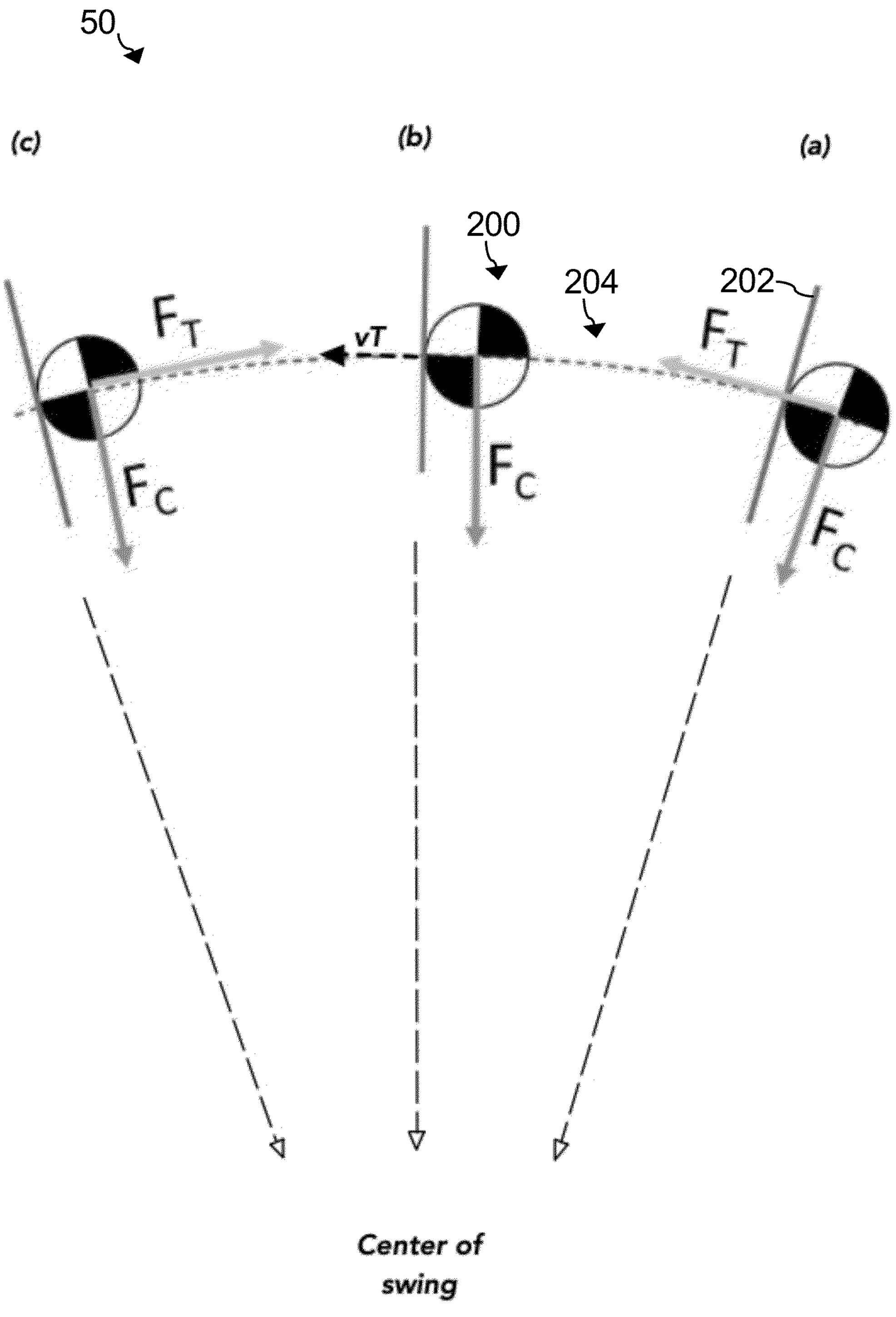
FIG. 5A illustrates a cross-sectional view of a simplified cylindrical putter shaft at three snapshots in time while rotational torque is applied.

Cross-sectional views 50 of a putter at times (a), (b), and (c) are illustrated in FIG. 5A, which is the same as or similar to FIG. 3 but with additional details discussed herein. The putter is represented as a cross section of cylindrical putter shaft 200. As a putting motion begins, at time (a), the player applies a force $F_T$ tangential to the trajectory, so that the putter accelerates along the trajectory. Gravity is also acting on the club adding to the tangential force when the club is angled with respect to the direction of Earth's gravitational pull. At the bottom of the swing or the apex of the swing arc (which we can describe as the center of the swing for this discussion although this can technically vary between players and situations), at time (b), the club is ideally moving at a constant velocity since the player is no longer pushing the club forward and is not pulling the club back. Said another way, the club is moving at a constant tangential velocity so the total tangential force at the center of the swing is zero. Finally, as the putt swing is completed at time (c), the club is decelerating along the path so $F_T$ reverses in direction.

At the apex (e.g., bottom) of the swing, the club is moving at a constant tangential velocity vT so the only force remaining is the centripetal force, Fc, acting to keep the putter on the swing arc. The centripetal force Fc acts on the center of gravity of the putter, is orthogonal to the trajectory, and points directly to the pivot point of the swing.

When a putter is balanced at its Cg, the putter face will naturally rest at a certain angle. If the face of the putter is in a vertical plane, i.e., is straight up and down with respect to the horizontal plane of the playing field or Earth, then the putter is said to be "toe-up." Toe-up position is achieved when the putter axis of rotation is directly above (toward the toe) the putter center of gravity when viewed straight down the shaft axis.

Figure 5B:
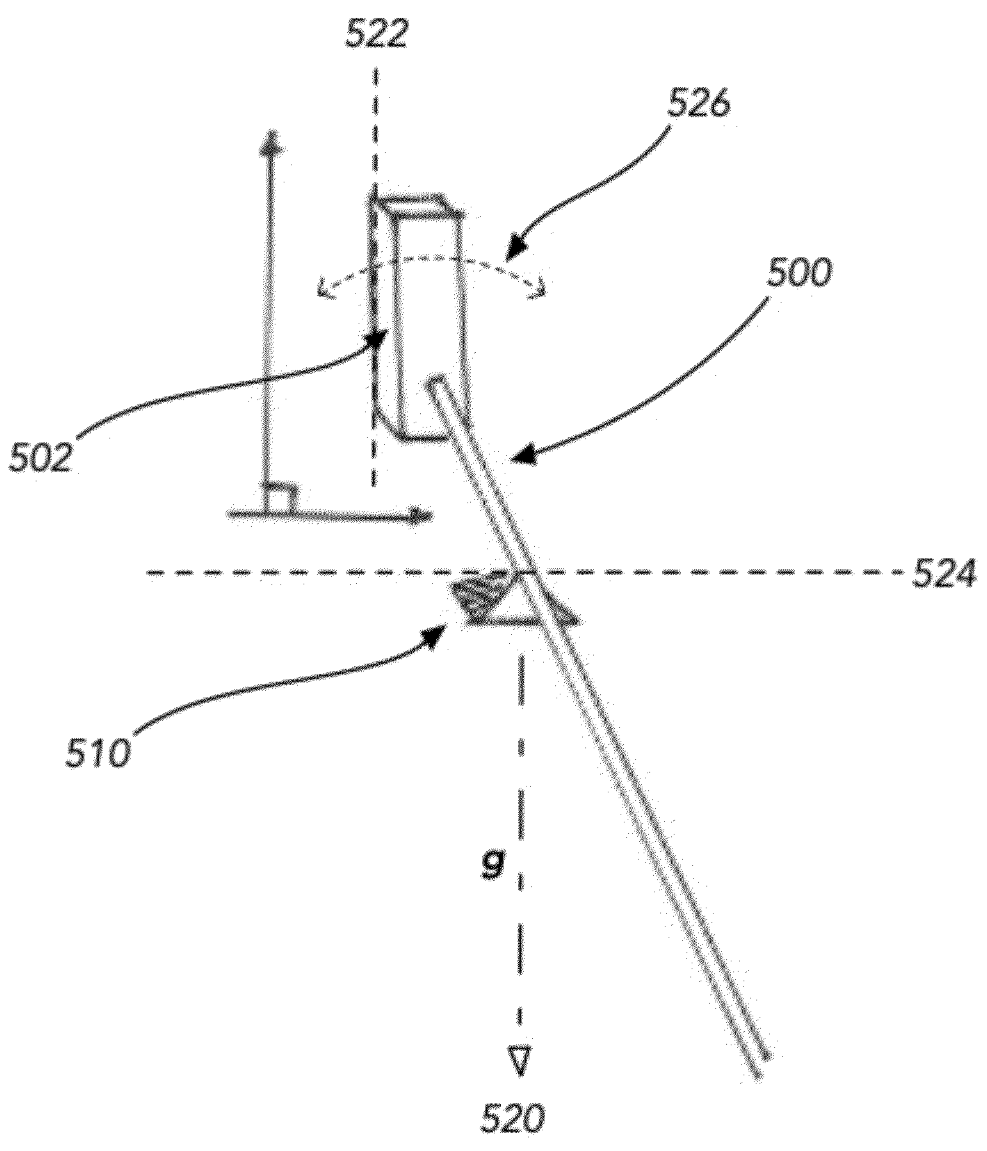
FIG. 5B is an isometric view of a toe-up putter according to an embodiment.

FIG. 5B illustrates a toe-up putter 500 as it will come to rest when placed on a balancer or allowed to naturally rest under the force of gravity 520 (which points downward in the figure). The balanced toe up putter 500 will rest with its face 502 aligned in a vertical plane 522 along 502, generally perpendicular to the horizon or plane of the playing field 524. When balanced on an actual or hypothetical balance point 510, the putter will tend to return to the shown vertical face position when it is at rest even if the putter 500 is perturbed with a rotational wobble 526.

A balanced putter face will therefore tend to remain square or seek the square position during play over the entire length of its trajectory, which is especially relevant at the point where the club strikes the golf ball. If the ball is hit at the apex of the swing, the only force is the centripetal force Fc orthogonal to the swing trajectory as described earlier.

This force can be simulated by lifting the putter horizontally letting gravity act as the inward force. If the putter rests toe up, then the inward force is not causing rotation, the face would tend toward square at this point in the trajectory, and the players hands would not feel a torque at this point if the face were square.

Figure 6:
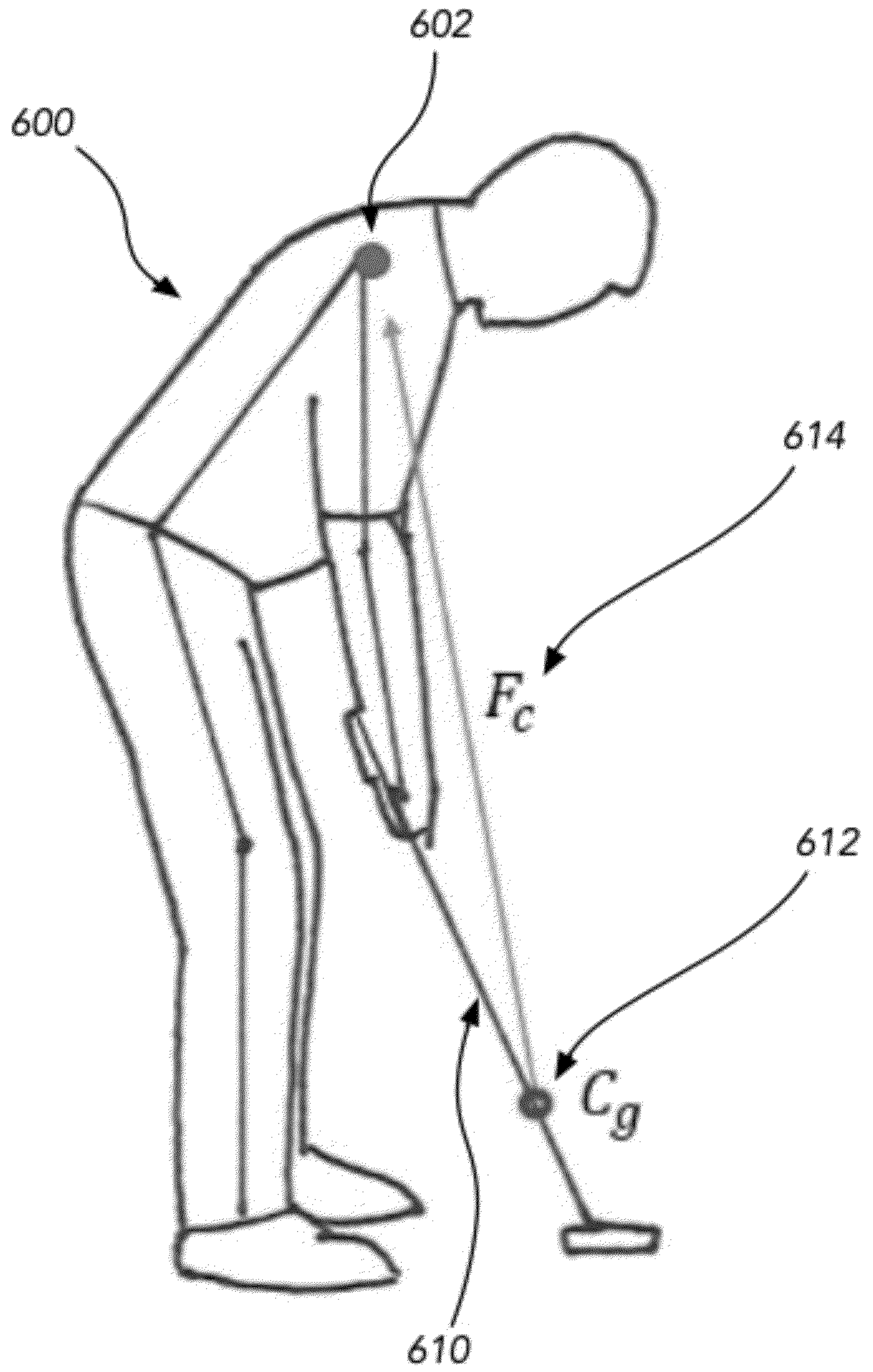
FIG. 6 is an isometric view of a golf player holding a golf putter according to an embodiment.

FIG. 6 illustrates a player 600 holding a golf putter 610. Cg is the center of gravity 612 of the putter 610. Fc represents the centripetal force 614 generated during an arc of a swing centered at or about pivot point 602, usually being near the player's neck or upper body as shown. A putter will rest (hang) in a toe up position if the putter Cg is lower than the shaft central axis when viewed down the shaft central axis.

Figure 7A:
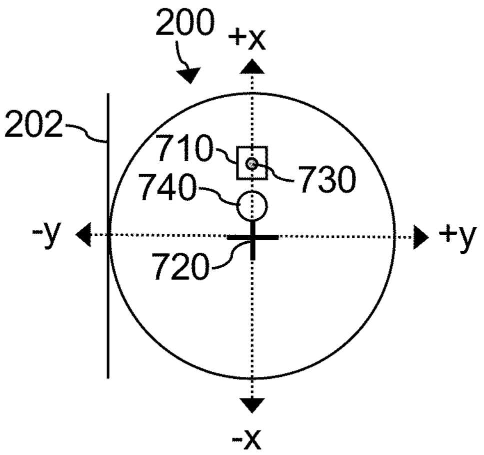
FIGS. 7A-C illustrate cross sections of a golf putter shaft having different toe-up putter configurations according to an embodiment.
Figure 7B:
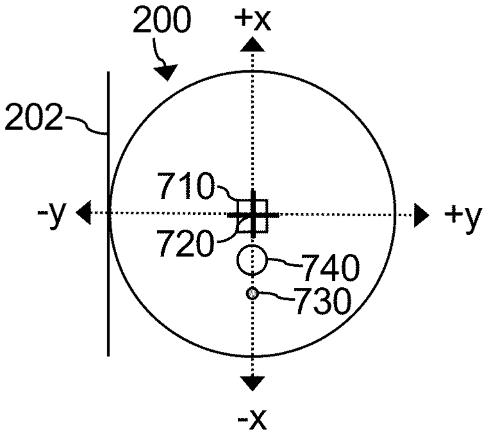
Figure 7C:
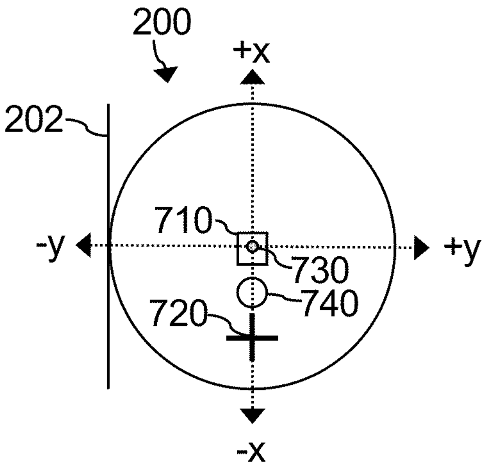

Referring to FIGS. 7A-C, and according to one or more aspects of the invention, a toe-up putter configuration and design can be achieved by varying the shaft contact point 710 (which corresponds to the location of the shaft central axis), the club-head Cg 720, and/or the shaft Cg 730. The shaft contact point 710 (axis of rotation of shaft/putter) is directly above the club Cg 740 in the toe-up configuration.

In FIG. 7A, a toe-up configuration is achieved by moving the shaft contact point 710 above the club-head Cg 720 (in the +x direction). In FIG. 7B, a toe-up configuration is achieved by shifting the shaft Cg 730 downward (−x direction) with weights/counterweights. In FIG. 7C, a toe-up configuration is achieved by shifting the club-head Cg 720 downward (−x direction) with weights/counterweights. Accordingly in some aspects, the present disclosure is directed to methods of design and manufacturing of golf putters having this attribute, including automated and machine-driven systems that optimize, design, and/or create golf putters that can achieve and/or maintain a dynamic balance during all or at least some portion of a putter swing (e.g., during the time window where the putter makes contact with the golf ball).

The lean of the shaft, either lie angle or forward lean, does not impact how the club hangs because the axis of rotation is down the shaft axis. Any movement of the contact point along the y-axis (assuming a centered shaft and head Cg) will cause the putter to hang at an angle no matter the shaft lie or forward lean angle.

Toe up behavior indicates that the putter Cg is below the shaft axis (shaft contact point 710. This attribute makes the putter tend toward square at the apex of a putt stroke. It does not indicate how well the club is balanced for the rest of the stroke, however. Generally, it is beneficial for the putter to be well balanced is when it impacts the ball. Thus, toe-up behavior is important if the ball is hit when the putter Cg is at the apex of the swing.

This means that for a toe-up putter with no forward lean, the ball should be hit at the apex of the swing arc. For a putter with forward lean, the putter Cg reaches its apex before the head. Therefore, for a toe-up putter with forward lean, the ball should be hit slightly back in the stance.

The Cg of a putter head is the weighted center of that putter head. By rigidly attaching a shaft to the putter head, the Cg of the whole putter moves toward the Cg of the shaft. Recall that the Cg takes into account the distribution of the elements of mass constituting the object and describes the point at which the object acts in response to the force of gravity on the object.

Figure 8:
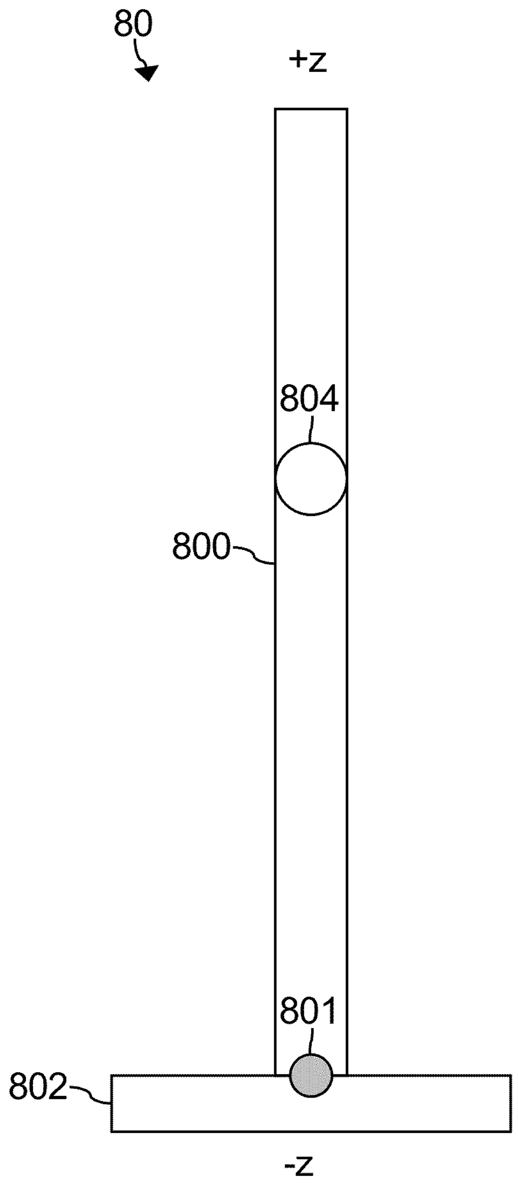
FIG. 8 is a side view of an example golf putter according to an embodiment.

In an example golf putter 80, if a putter shaft 800 is rigidly connected directly at point 801 to a putter head 802 center of gravity Cg and points straight up therefrom (along the positive z direction away from the direction of gravity), then the Cg of the putter 804 moves upward in the positive-z direction toward the shaft Cg as illustrated in FIG. 8.

The final position of the putter Cg 804 is the weighted sum of the shaft Cg and the putter-head Cg, as provided in Equation 1.

$$C_{g,p} = \frac{m_h}{m_h + m_s} * C_{g,h} + \frac{m_s}{m_h + m_s} * C_{g,s} \tag{1}$$

In Equation 1, $C_{g,p}$ is the Cg of the golf putter, $C_{g,h}$ is the Cg of the golf-putter head, $C_{g,s}$ is the Cg of the golf-putter shaft, $m_h$ is the mass of the golf-putter head, and $m_s$ is the mass of the golf-putter shaft.

If the mass of the shaft $m_s$ relative to the putter head mass $m_h$ is substantial, or if the center of gravity of the shaft is very far away, then the center of gravity of the whole putter moves upwards (+z direction) significantly.

The equation for Cg is linear (each axis is independent) and works in all three dimensions, so for example each of the coordinates in x, y, z can be individually or collectively considered according to Equation 2.

$$\vec{C}_{g,p} = \frac{m_h}{m_h + m_s} * \vec{C}_{g,h} + \frac{m_s}{m_h + m_s} * \vec{C}_{g,s} \tag{2}$$

Therefore, the center of mass of the putter always moves between the center of mass of the head to the shaft center of mass along a straight path. That line terminates at the head Cg on one end and the shaft Cg on the other end. The point on which it falls along that path is the ratio of the masses of the head and the shaft in this example. For a very heavy head relative to the putter shaft the overall Cg would lie close to the head, while if the shaft was extremely heavy compared to the head, the Cg of the putter would be much closer to the shaft Cg. For a typical putter, the Cg of the putter may lie about seven inches above the head Cg along the putter shaft. Those skilled in the art will understand that these are merely examples and that this will vary depending on the construction and dimensions of a given product.

Figure 9A:
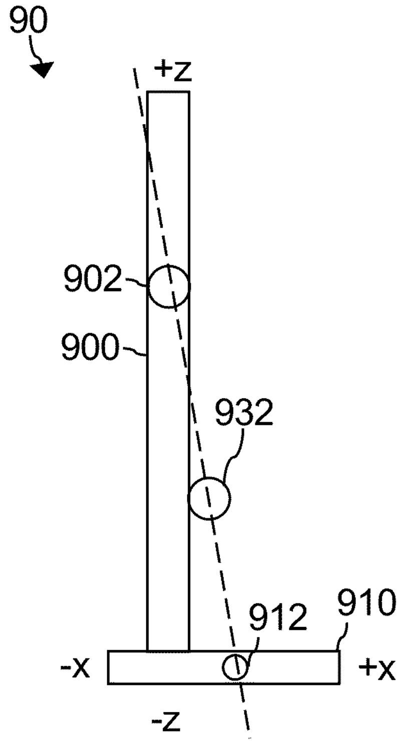
FIGS. 9A and 9B are side views of putters with different lie angles according to an embodiment.
Figure 9B:
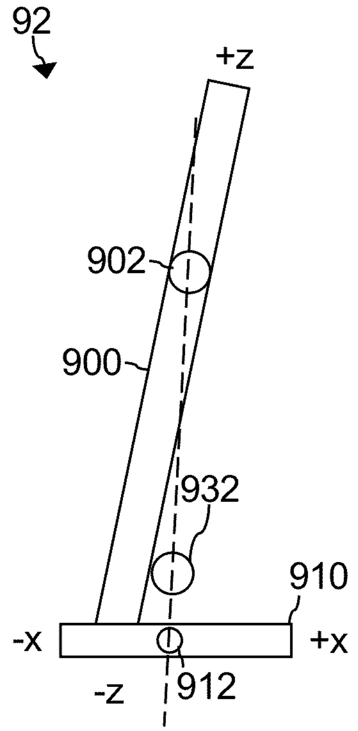
Figure 10A:
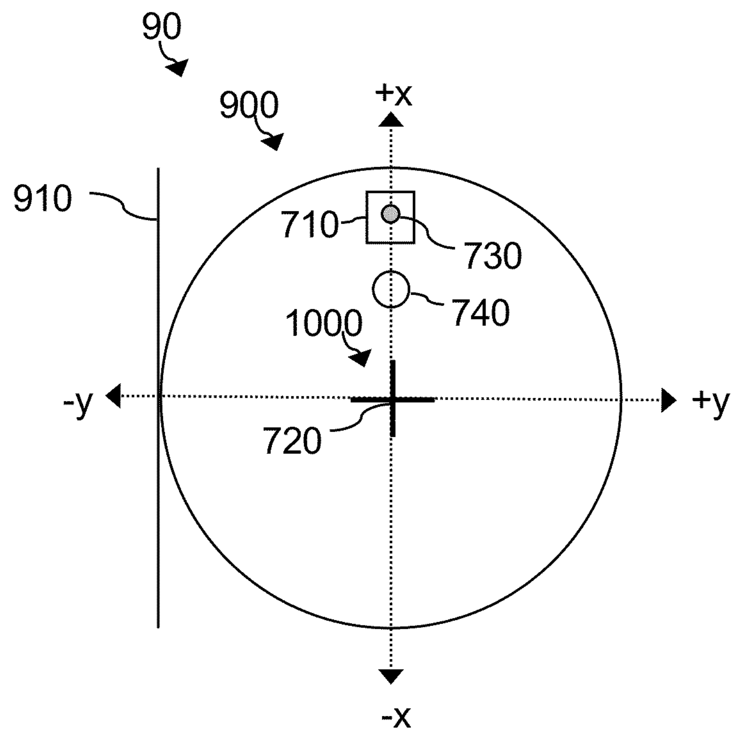
FIGS. 10A and 10B are top views of the putters illustrated in FIGS. 9A and 9B.
Figure 10B:
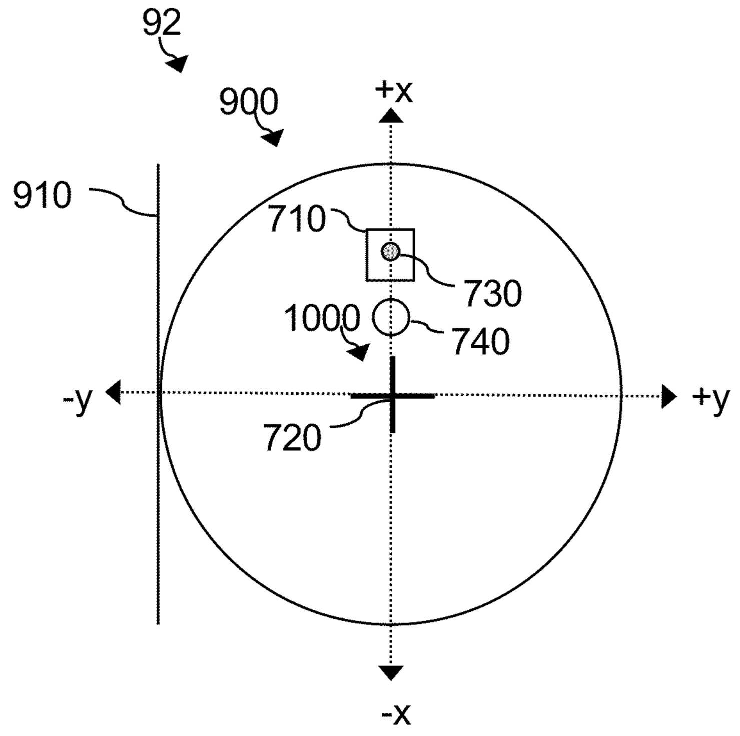

Referring to FIGS. 9A and 9B, consider a putter 90, 92 having an overall center of gravity 932, with a shaft 900 with a shaft Cg 902. The shaft 900 is connected above the head Cg 912 (+x direction) of the putter head 910. As lie angle changes, the putter Cg moves in the −x direction and drops in the −z direction. The configurations illustrated in FIGS. 9A and 9B is illustrated looking down the central axis 1000 of the shaft 900 in FIGS. 10A and 10B, respectively. Because the shaft 900 is straight in this example, the shaft Cg 730 is aligned with contact point 710. The putter/club Cg 740 has moved upwards toward the shaft Cg 730 in FIG. 10B compared to FIG. 10A.

Applying forward lean and lie angle to a straight shaft moves the putter Cg slightly lower than it would be without forward lean and lie angle, but the Cg still falls in-line and between the head Cg and the shaft Cg as discussed above.

Moment of inertia (MOI), or rotational inertia, is an object's resistance to a change in rotational velocity around a given axis. The higher the rotational inertia, the more torque is needed to rotate the object about the given axis.

In an aspect, we determine the putter's MOI about the shaft central axis (e.g., axis 415, 1000) as this informs how the forces of the putter rotate the club in the player's hands. The object's MOI is described by its orthogonal x, y, z values, having respective MOI components $I_x$, $I_y$, and $I_z$. The closer the mass concentration is to an axis, the lower the MOI about that axis.

The swing calculations provide a motion of the putter along a desired path in order to strike a golf ball a defined distance. Again, these time and position values can be imported directly and used to calculate the swing dynamics, discussed below. The force on the putter is back-calculated by the desired motion of the putter. The force on the putter is then used to calculate a torque and finally any rotation of the putter. The force at any given time is given by Equation 3.

$$F=ma \tag{3}$$

The torque on the putter is calculated according to Equation 4.

$$\tau=r\times F \tag{4}$$

where r is a vector orthogonal to the central shaft axis of rotation at the center of gravity and F is the force vector. Equation 4 can be rewritten as the following:

$$\tau=I\alpha \tag{5}$$

where I is the MOI and α is the angular acceleration.

The component of the torque that rotates the club is given by the dot product of the torque τ and the shaft axis, where the dot product represents a scalar value $$\tau_{shaft}=\tau\cdot\overrightarrow{shaft} \tag{6}$$

Finally, the rotation of the putter is given by the same rotational equations of motion.

$$\alpha=\tau_{shaft}/I_{putter} \quad (7)$$

$$v=v_0+\alpha t \quad (8)$$

$$\theta_r=\theta_0+vt-\tfrac{1}{2}\alpha t^2. \quad (9)$$

Where $\alpha$ is the acceleration of the putter, v is the velocity of the putter, $v_0$ is in the initial velocity of the putter, t is time, $\theta_r$ is the swing-path angle, and $\theta_0$ is the initial swing-path angle at the beginning of the swing.

The present examples describe the physics, mathematics and dynamics of the embodiments using Cartesian (x, y, z) coordinate systems, which are common in engineering and other disciplines. However, those skilled in the art will appreciate that other coordinate systems and reference frames (e.g., cylindrical or spherical coordinates) may also be employed with corresponding descriptors and equations, without loss of generality, and any such descriptions and models are comprehended by this disclosure.

We now discuss methodologies for determining MOI in a golf putter according to aspects of the present products and methods. If the putter club head and shaft are designed independently, its useful to be able to position the shaft to any lie angle and forward lean angle and calculate the resulting MOI without the use of CAD software. To do so requires an initial measurement of the putter head MOI around orthogonal x, y, and z axis, i.e., $I_x$, $I_y$, $I_z$, respectively. Rotational matrices $R_x$, $R_y$ can be used to apply lie angle and forward lean and calculate the updated MOI.

$$R_x=\begin{pmatrix}1 & 0 & 0\\ 0 & \cos\theta & -\sin\theta\\ 0 & \sin\theta & \cos\theta\end{pmatrix} \quad (10)$$

$$R_y=\begin{pmatrix}\cos\rho & 0 & \sin\rho\\ 0 & 1 & 0\\ -\sin\rho & 0 & \cos\rho\end{pmatrix} \quad (11)$$

The MOI given a lie angle of $\theta$ and a forward lean angle of $\rho$ is given by the equation:

$$I=RI_{xyz}R^T \quad (12)$$

where R is the product of $R_x(\theta)$, the rotational matrix for lie angle, $\theta$, and $R_y(\rho)$, the rotational matrix for forward lean angle, $\rho$ and where:

$$R=R_y(\rho)R_x(\theta) \quad (13)$$

$$I=\begin{pmatrix}I_x & 0 & 0\\ 0 & I_y & 0\\ 0 & 0 & I_z\end{pmatrix} \quad (14)$$

I is the new inertia matrix and $I_{xyz}$ is the original inertia matrix. The final putter head MOI is $I_z$ of the resulting matrix.

As a putter shaft is tilted for lie angle and forward lean, the MOI of the whole putter shifts toward the MOI of the x and/or y axis, respectively.

If the shaft were connected to the Cg of the putter head, the total MOI would be the sum of the head MOI adjusted for lean angles and the shaft MOI. If the shaft is connected offset from the putter head Cg, the total MOI is given by the parallel axis theorem, given as follows:

$$I=I_{cg}+Mr^2 \quad (15)$$

where $I_{cg}$ is the MOI of the putter if the shaft were connected to the head Cg, and M is the total mass of the putter, and r is the offset distance.

Figure 11A:
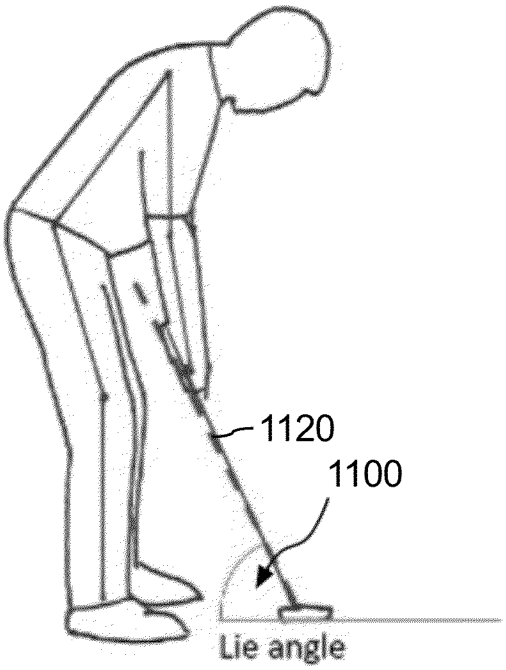
FIGS. 11A and 11B are isometric views illustrating a putter lie angle and a golf player's swing angle according to an embodiment.
Figure 11B:
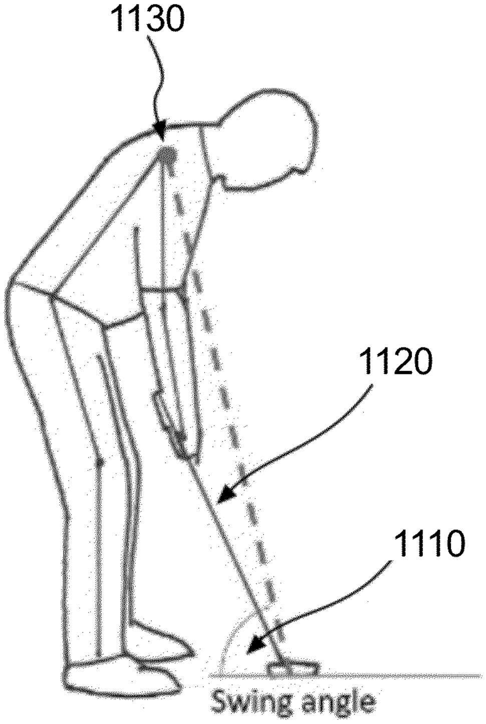

Examples of a putter lie angle 1100 and a golf player's swing angle 1110 are illustrated in FIGS. 11A and 11B, respectively. The putter 1120 swing path describes the movement of the putter head Cg. Most players will rotate the club around a pivot point 1130 located approximately around their shoulders, upper sternum or under the player's chin or near the neck area, as mentioned earlier. Given a putter with a lie angle 1100, the swing angle 1110 is typically steeper (e.g., larger relative to a horizontal axis) than the lie angle 1100.

Figure 12A:
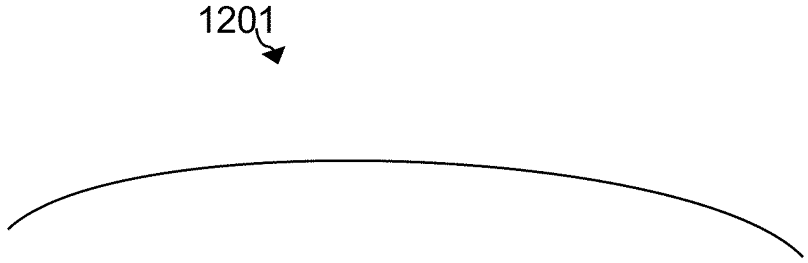
FIGS. 12A and 12B are top views of different example swing paths.
Figure 12B:
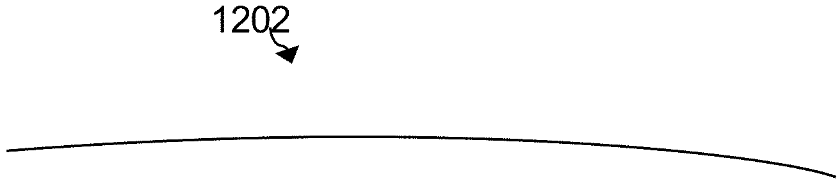

FIGS. 12A and 12B are top views of different example swing paths. Swing path 1201 is an elliptical swing path, which would occur if the club were swung perfectly around a pivot point (e.g., pivot point 1130). However, most players will differ slightly from this path creating a unique swing path that is dependent on the player and putter. For example, many players have a flatter swing path 1202.

When a putter is swung, a force is applied through the putter shaft to guide the head of the putter along the swing path 1201, 1202. When the force vector has a component that is orthogonal to the shaft central axis (e.g., axis 415, 1000), a torque is generated that tends to rotate or twist the club around the center shaft axis.

An aspect of the invention is to provide a dynamically balanced putter design. By doing so, we minimize the torque felt by the player throughout the swing path. This torque would be the torque required to keep the putter face square to the swing path. By minimizing the torque, the player can more easily control and repeat a putt, resulting in more accurate putting.

Figure 13:
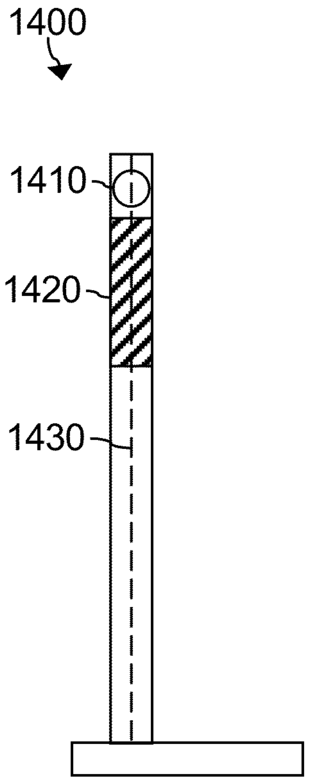
FIG. 13 is a side view of a golf putter that includes a counterweight according to an embodiment.

In some examples, a counterweight 1410 can be added at or above the handle 1420 of a golf putter 1400, as illustrated in FIG. 13. This addition has two effects. First, the center of gravity is shifted proportionally toward the counterweight. Second, the moment of inertia is increased. If the counterweight is mounted along the primary shaft axis 1430, the center of gravity moves upward and toward the shaft axis, reducing the impact of an offset putter head. The putter MOI is increased by the MOI of the counterweight through its center axis. If the counterweight is mounted offset from the primary shaft axis, the center of gravity moves upward and proportionally toward the counterweight offset location. Depending on the offset, this may increase or decrease the impact of the offset head. The putter MOI is increased following the parallel axis theorem in Equation 16.

$$I=I_c+Md^2 \quad (16)$$

I is the total MOI of the counterweight, $I_c$ is the MOI along the center axis, M, is the counterweight mass, and d is the distance offset from the shaft axis.

Custom software is used to simulate the putter as described above. Rapid, accurate and automated adjustments to the relevant design parameters are possible, including for one or more of: the lie angle of the golf putter, the forward-lean angle of the golf putter, the shaft offset distance from the putter-head Cg, the shaft mass, the shaft length, the shaft Cg, the shaft MOI, the putter-head mass, the putter-head Cg, the putter-head MOI, the golf player's height, the golf player's swing path, the golf player's pivot point for the swing, and/or example putt distance.

Figure 14:
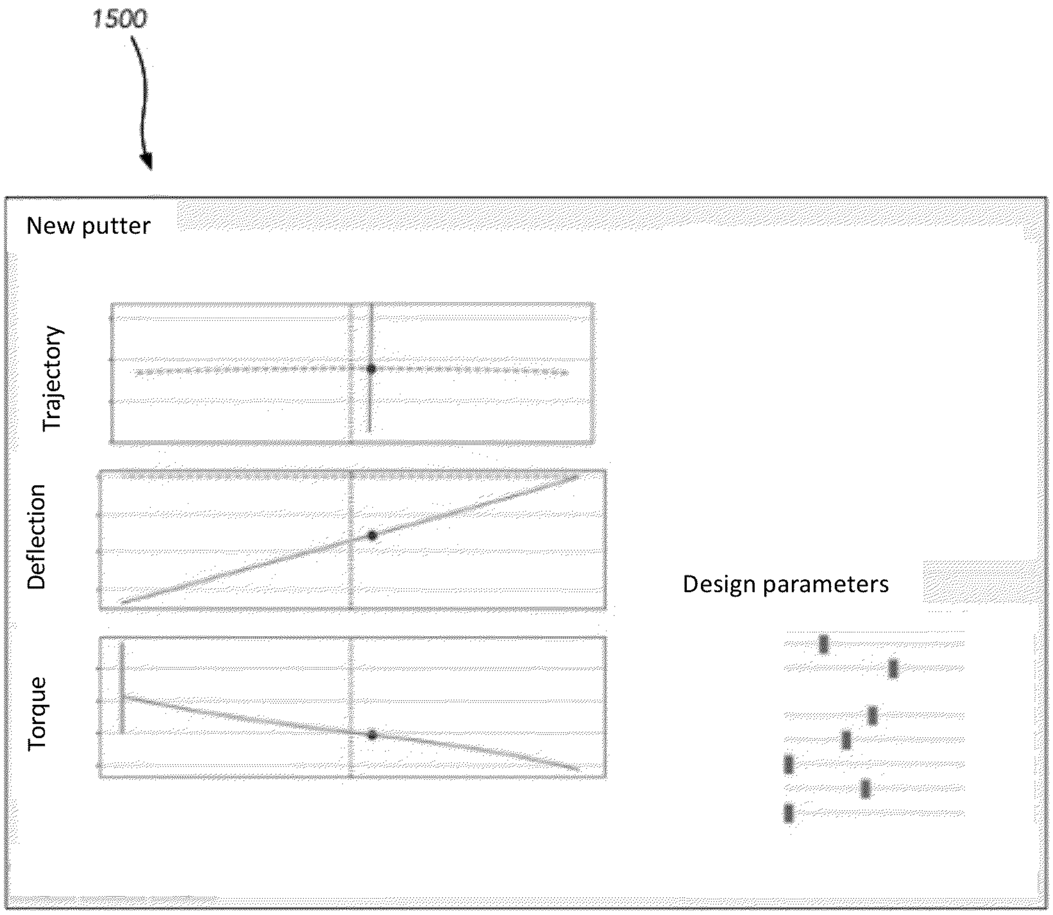
FIG. 14 illustrates a user interface according to an embodiment.

In an aspect, a machine-executable instruction set, computer program and data are provided that determine, optimize and cause the generation of one or more digital objects, files, output data structures describing the present dynamically balanced putters. Specifically, said programs and associated logic hardware are used to take input signals, measurements and/or input data from a data source or from a user by way of a user interface 1500 as illustrated in FIG. 14.

Swing paths can be modeled using said software and/or hardware to produce useful output data or physical designs for putters based on swing angles or, when imported as arbitrary points for paths custom to a given player. Input data relevant to a given player may be generated ad hoc or may be collected by analyzing and tracking movements of the given player as he or she swings a putter or putter mockup so as to gather details of the given player's anatomy and technique.

These swing paths may be captured or measured via an inertial measurement system, video tracking system, or similar motion capture systems. Fiduciary points, reflecting features and electronic tracking markers may be attached to the player's body and/or golf equipment to enable such photographic or automated tracking and gathering of the player-specific data. Additionally, ball impact points may be made adjustable to minimize the torque before the time of impact.

Figure 15:
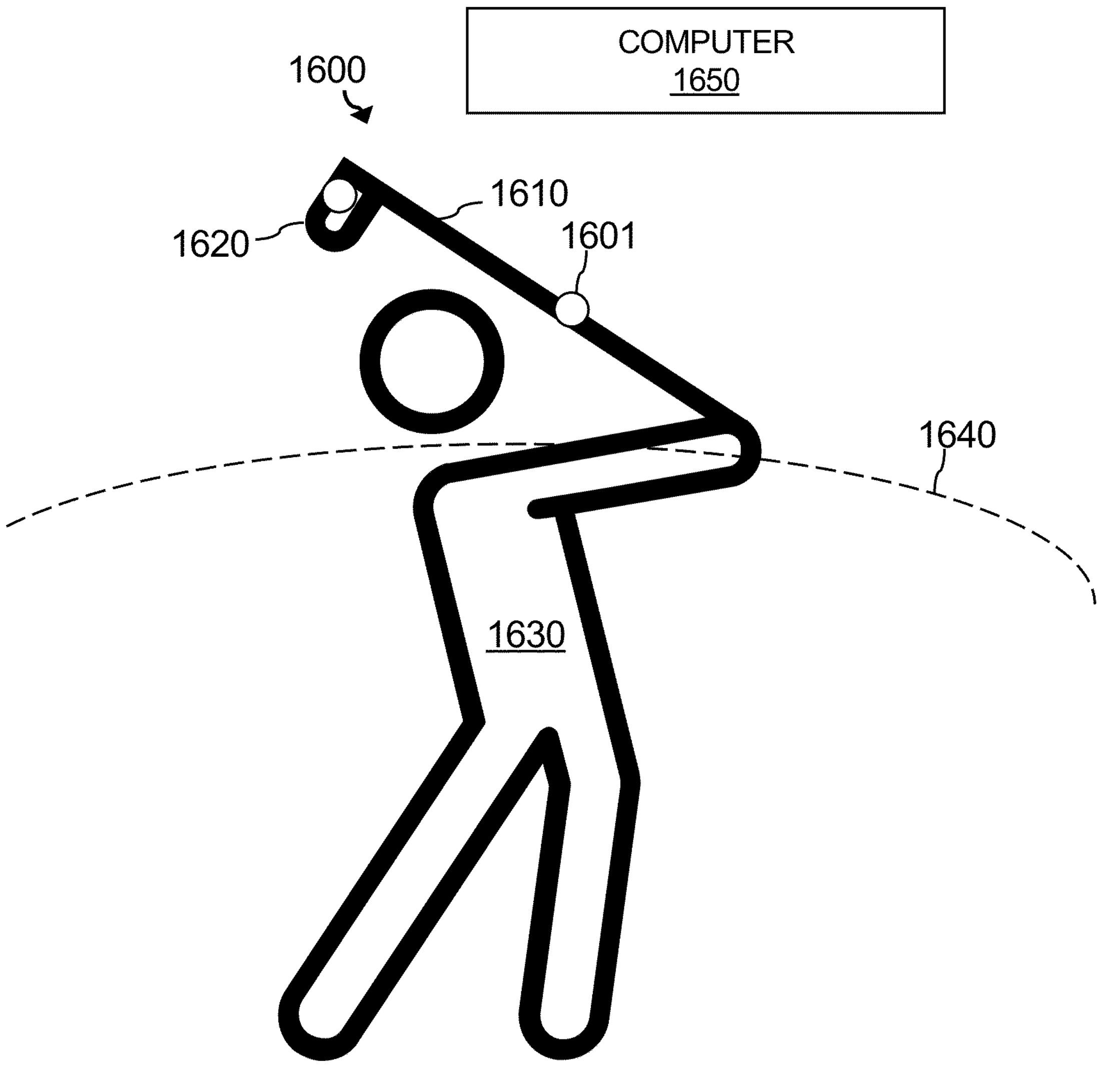
FIG. 15 is a simplified example of a sample putter having sensors placed thereon according to an embodiment.

For example, measuring the swing path can include placing one or more sensors on a sample putter and/or on the golf player to acquire swing-path data while the golf player swings the putter. The sensors can include one or more inertial sensors, one or more gyroscopes, one or more accelerometers, and/or one or more other sensors. A simplified example of a sample putter 1600 having sensors 1601 placed thereon is illustrated in FIG. 15. The sensors 1601 can be placed on the shaft 1610 and/or on the head 1620 of the sample putter 1600. Data acquired by the sensors 1601 as the golfer 1630 swings the putter 1600 over a swing path 1640 can be output to a computer 1650, which can be in wired or in wireless communication with the sensors 1601. Examples of wireless communication include a local wireless connection such as Bluetooth. A wide-area connection such as WiFi and/or a cellular network can also be used. Alternatively, the sensor(s) 1601 can store data in a local memory (e.g., a USB drive) or in remote memory (e.g., on a server) and the data can be downloaded to the computer 1650 directly or indirectly (e.g., via an intermediate computer such as a laptop or smartphone).

Figure 16:
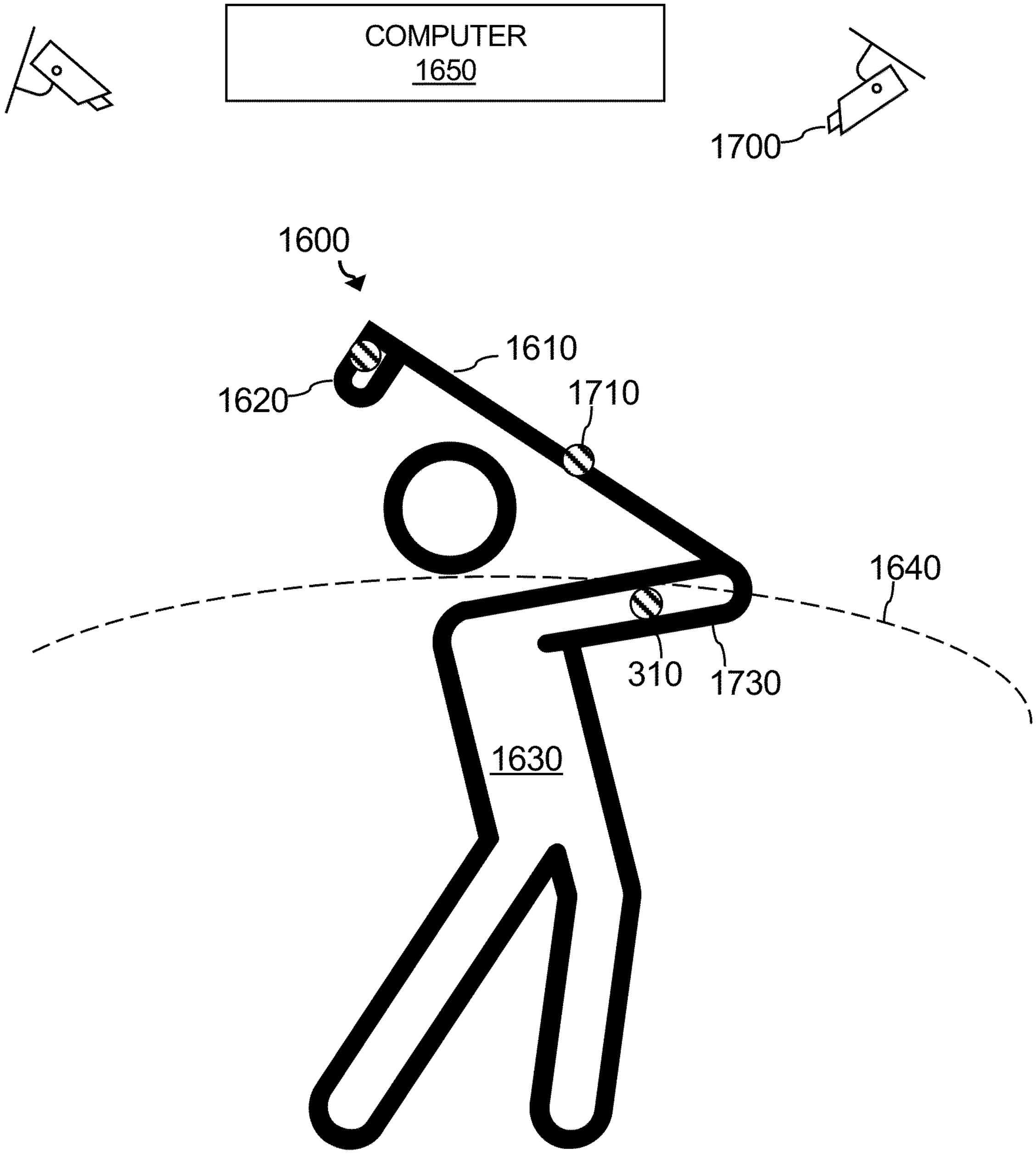
FIG. 16 is a simplified example of a system to capture a golf player's swing path according to an embodiment.

Additionally or alternatively, the swing path 1640 can be measured using one or more cameras 1700, as illustrated in FIG. 16. One or more fiducial marks 1710 can be placed on the shaft 1610 and/or on the head 1620 of the sample putter 1600 to assist with video processing. Additionally or alternatively, one or more fiducial marks 310 can be placed on the golf player 1630, such on the arms 1730 and/or hands. The camera(s) 1700 can be in wired or in wireless communication with the computer 250. Alternatively, the camera(s) 1700 can store data in a local memory (e.g., a USB drive) or in remote memory (e.g., on a server) and the data can be downloaded to the computer 1650 directly or indirectly (e.g., via an intermediate computer such as a laptop or smartphone). The cameras 1700 can be replaced with and/or can include a three-dimensional tracking system.

In a non-limiting example, the software may be provided with and include an interface 1500, which can depict one or more of: Main Top—Swing trajectory has viewed from above, putter face and putter head Cg; Main Middle—Deflection of the putter face relative to the swing path; Main Bottom—Torque experienced by the player to keep the putter face square to the path; Top—Projection of putter along the shaft center axis showing the shaft, head, and putter Cg relative to each other. The putter face direction and force direction are also indicated; and user-specified Parameters—e.g., real time adjustment to all design parameters.

Given a putt path and initial putter design, the software optimizes for the shaft offset position to minimize torque through the swing path. Swing paths can either be modeled or measured and imported. Modeling the swing path using parameters such as lie angle, swing angle, player height, etc. can provide a best estimation for a typical player. Alternatively, a player's swing may be measured using a camera (e.g., cameras 1700), inertial measurement unit (e.g., sensors 1601), 3D tracking systems, etc. and directly imported into the software for a highly customized solution. Swing paths can be imported as arbitrary points measured along a player's swing. These swing paths may be captured via an inertial measurement system, video tracking system, or similar motion capture systems. Ball impact points are adjustable to minimize the torque before the time of impact. Therefore, if the player's time and spatial configuration, e.g., body, swing, movements are captured using a 3D image, video or tracking system (or alternatively a plurality of 2D captures) then the need to model the player is avoided or reduced and actual player swing data can be used.

Various parameters can be used to model the swing path which can provide an estimate of the golf player's actual swing path. These parameters can include golf-putter parameters and/or golf-player parameters. Examples of golf-putter parameters include the putter lie angle ($\theta_{tie}$), putter forward-lean angle ($\rho_{lean}$), shaft offset, shaft mass ($m_{shaft}$), shaft length, shaft center of gravity (CG) ($CG_{shaft}$), shaft MOI ($MOI_{shaft}$), head mass ($m_{head}$), head CG ($CG_{head}$), head MOI ($MOI_{head}$), golf-putter CG ($CG_{total}$), golf-putter MOI ($MOI_{total}$), and/or another golf-putter parameter. Examples of golf-player parameters include physical features of the golf player such as the golf player's height and/or the pivot point of the putter swing. It is understood that other golf-player characteristics/measurements, golf-club characteristics/measurements, and/or other model input data can be used to achieve the same or equivalent results.

An example or representative length of the putt distance can also be used to model the swing path. The putt velocity can be modeled such that the tangential force along the putt path is proportional to the distance from the center of the swing. The computer can generate a circular trajectory that is angled at the swing angle. The total arc length can be determined such that the final velocity of the putter matches the desired initial velocity of the putt.

In one example, a player's swing axis pivot point about which the putter swings can be assumed to be about 82% of the player's total height. As used herein, "about" means plus or minus 10% of the relevant value. For most players this places the center or pivot point of a swing at about the player's neck, between the player's sternum and chin. In other words, in an example, the modeled height of such a pivot point would be $h_{pivot}=0.82h_{total}$.

The distance to the golf ball can be estimated by assuming that the player is bent forward slightly, e.g., 30 degrees from vertical, where the player is bent at the waist and looking down at the ball. A player's waist may be assumed to be at a height that is about 48% of the player's total. The distance to the golf ball is equal to the player's stance distance (distance between the player's feet) which can be modeled as $d_{stance}=0.48h_{total}\sin(30°)$ where 30° is the angle between the player's legs when the player is in a golf stance. This distance can also equal to distance between the swing pivot point to the golf ball.

The swing-plane angle with respect to the vertical can be modeled as $\theta_{swing}=\tan^{-1}(h_{pivot}/d_{stance})$ where $\theta_{swing}$ is the swing-plane angle.

In some examples, the radius of the swing plane can be modeled. The radius of the swing plane can be modeled as the hypotenuse of a triangle formed by the swing pivot point and the player's stance distance (between the player's feet) as $$r_{swing} = \sqrt{h_{pivot}^2 + d_{stance}^2}$$

where $h_{pivot}$ is the player's swing axis pivot point and $d_{stance}$ is the player's stance distance.

The swing setup can be modeled in some embodiments. For example, we can assume that the putter is swung along a circular path that is angled at the swing plane angle. However, in other embodiments the swing path can be modelled as an elliptical or another path.

The peak velocity of a putter head can be modeled or approximated as about 20% of the intended putt distance. Therefore, in an embodiment, the model may use the relationship $v_{club,peak}=0.2d_{putt}$.

Additionally, or alternatively, the model can estimate the back swing angle using the maximum swing angle (e.g., about 30 degrees) and a maximum swing velocity (e.g., about 3 m/s), or $$\theta_{back} = 30\frac{v_{club,peak}}{3}.$$

The foregoing examples are merely exemplary and illustrative ways of generating a swing model to apply in an exemplary corresponding method. Those skilled in the art will understand that alternative or different specific models and examples can be used for different applications.

It is of interest in discussing dynamically balanced putter design to consider forces and torques that cause or tend to rotate a putter about its axis. According to an aspect of one or more embodiments, these can be modeled based on vertical forces needed to reach the peak club velocity mentioned earlier, taken over the whole or part of the arc of the swing. For example, $$\alpha_{vertical} = v_{club,peak}^2/(2h_{club\_back})$$

Here $h_{club\_back}$ is the height of the putter head at the back swing angle, which can be modeled as $h_{club\_back}=r_{swing}(1-\cos(\theta_{back}))$ where $r_{swing}$ is the swing radius.

The acceleration $\alpha_{vertical}$ of the putter head can be modeled as a constant vertical acceleration. The whole system (e.g., player and putter) can be modeled as a point mass at a swing radius $r_{swing}$ with a moment of inertia (MOI) of $m_{putter}r_{swing}^2$ where $m_{putter}$ is the total putter mass and $r_{swing}$ is the swing radius. The vertical force applies a torque to the putter that rotates the putter along an arc. The total time to complete the swing is therefore given by $t_{forward}=\pi\sqrt{r_{swing}*\alpha_{vertical}}$.

The foregoing model gives equations of motion that can be used to determine useful relationships and that can be used to optimize, minimize or improve for a target parameter such as to eliminate or minimize torque during the putter swing over the arc of the swing, i.e., minimizing the integral thereof. For example, Equations 7-9 can be used to minimize the integrated torque over the putter swing.

In some aspects, the base putter design is imported into the software. Next, the swing path is generated or imported. All parameters can be adjusted from their initial settings. The software optimizes the shaft x-offset and y-offset by sweeping through all reasonable values and measuring the total face deflection along the swing. The offsets and design parameters that minimize the total deflection are selected.

In some embodiments, the design characteristics are directed to improving, optimizing or determining the desired or best center of gravity and/or moment of inertia of a putter about its shaft axis. In an aspect, putter center of gravity is estimated by considering the shaft, grip, and head independently. Extending the putter length extends the length of the putter shaft uniformly. The total Cg of the putter is the weighted sum of each component.

$$\vec{C}_{g,p} = \frac{m_{head}}{m_{head}+m_{shaft}+m_{grip}} * \vec{C}_{g,head} + \frac{m_{shaft}}{m_{head}+m_{shaft}+m_{grip}} * \vec{C}_{g,shaft} + \frac{m_{grip}}{m_{head}+m_{shaft}+m_{grip}} * \vec{C}_{g,grip} \quad (17)$$

In Equation 17 we see that as the lie angle and forward lean is applied, the Cg of both the grip and the shaft of the putter rotate accordingly.

The moment of inertia about the shaft central axis is calculated based on any forward lean, lie angle and independent moment of inertia of the putter head and the shaft through their respective Cg points, about an orthogonal (x, y, z) axis, which are denoted $I_x$, $I_y$, and $I_z$, respectively. The rotational matrices and moments of inertia resulting are as described earlier.

Figure 17:
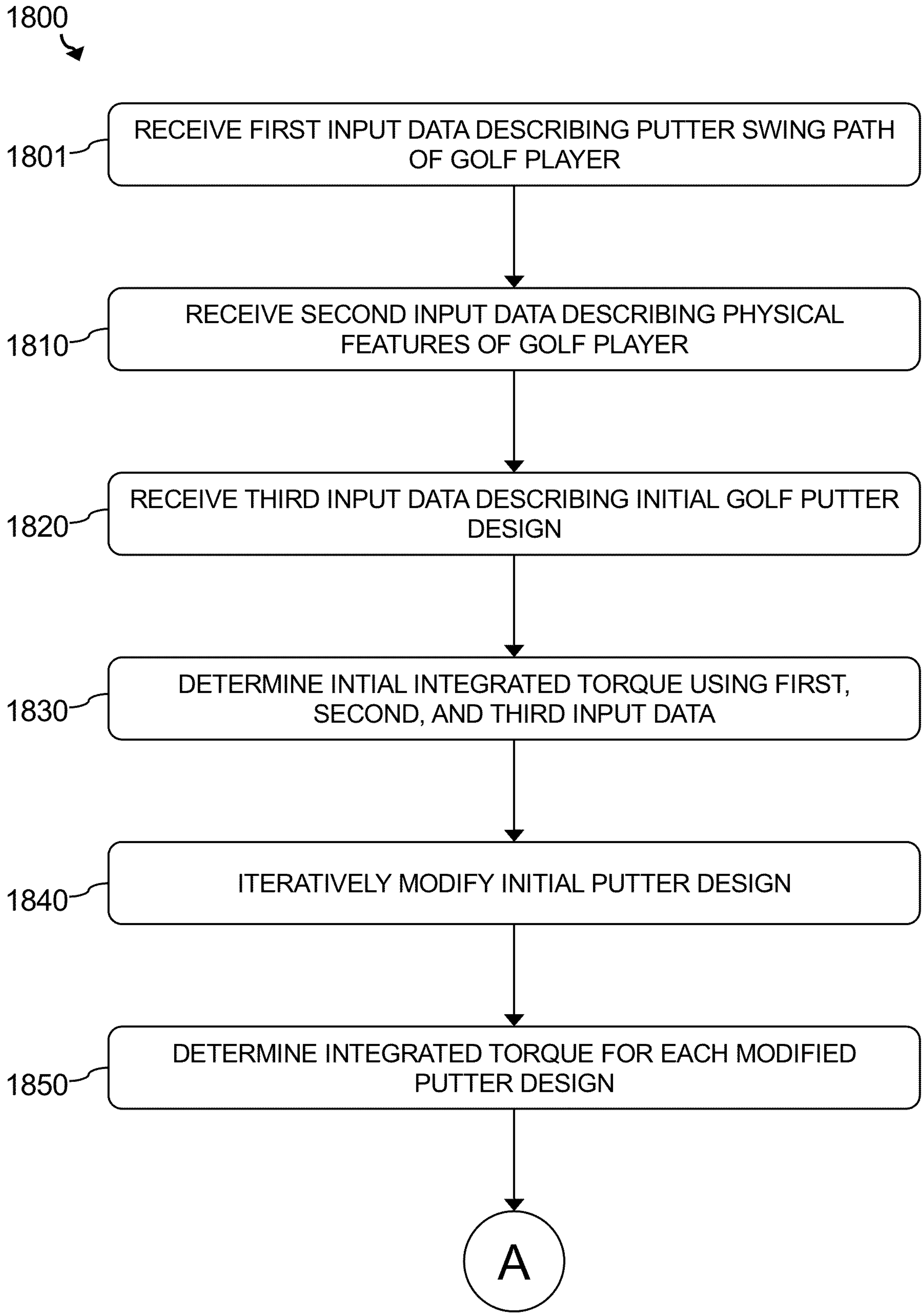
FIG. 17 is a flow chart of a method for manufacturing a custom dynamically balanced golf putter for a golf player according to an embodiment.
Figure 17:
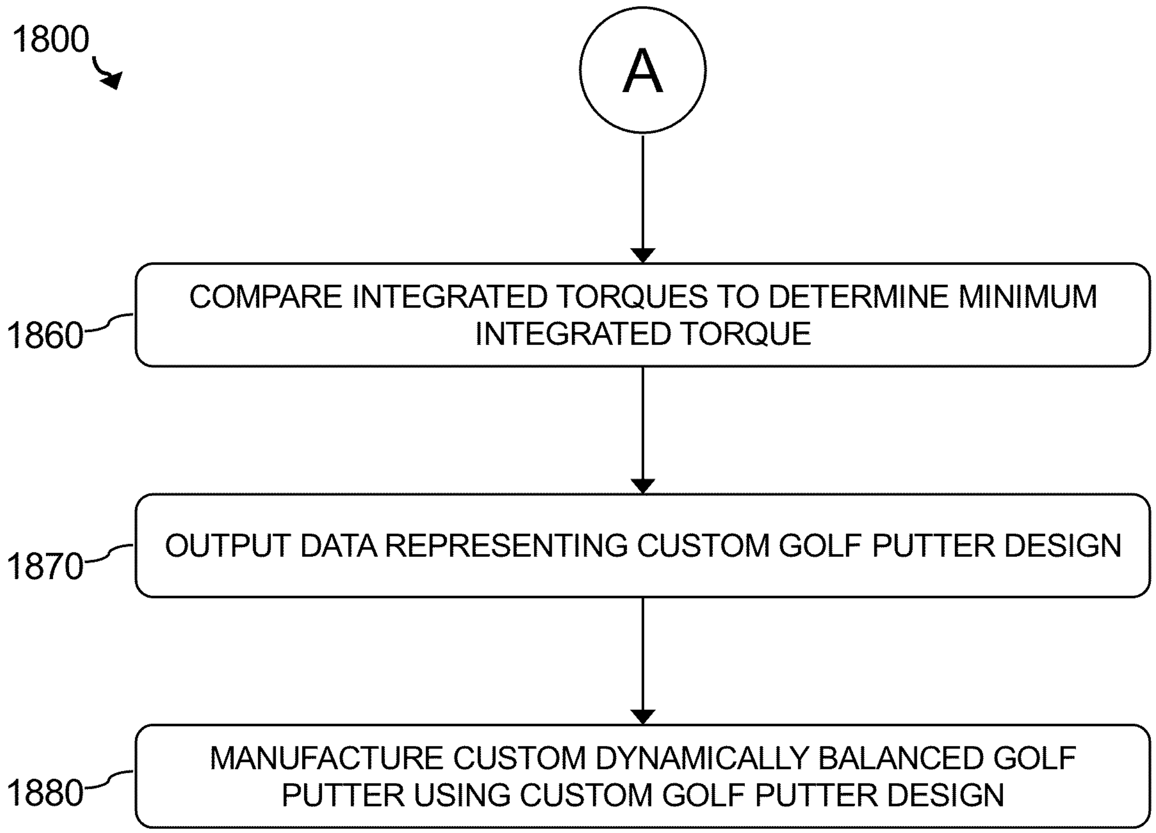

FIG. 17 is a flow chart of a method 1800 for manufacturing a custom dynamically balanced golf putter for a golf player according to an embodiment. In some embodiments, a custom designed and optimized golf club can be determined using the present system and method. Similarly, if a unique one-off exact design is not appropriate or is found to be too costly, the method and system can be used to determine the nearest existing components to combine or fit into a custom product for a player. For example, if a plurality of sizes and shapes and weights of club parts are provided, the present method and system can identify the best suited components for use in a custom-built product for a player. Examples can include options for club heads, shafts, grips, hosels and other club parts.

In step 1801, a computer receives first input data that represents or describes the swing path of a putter by the golf player. The swing path can be measured or modeled. Measuring the swing path can include placing one or more sensors (e.g., sensors 1601) on the putter and/or on the golf player to acquire swing-path data while the golf player swings the putter. Additionally, or alternatively, the swing path can be measured using one or more cameras (e.g., cameras 1700).

Other inputs representing the characteristics, dimensions, geometry or behavior of a golf player or user of the present device can be input to the system and method for optimizing a golf club for said player. For example, any measurements of the player's arms, chest, shoulders, legs (generally for example measurements made to fit a custom clothing suit for a player) would be possible to use in generating the present design. Since the player's arms and legs are material to some aspects of an optimum club design (e.g., equivalent of sleeve lengths or inseams) these can be useful inputs for designing a custom golf club for a player and the present system and method comprehend using such common player measurements.

In step 1810, the computer receives second input data that represents or describes one or more physical features of the golf player. The physical features can include the golf player's height (e.g., $h_{total}$), the golf player's stance distance ($d_{stance}$), the golf player's waist height, and/or other physical features.

In step 1820, the computer receives third input data that represents or describes an initial golf putter design. The initial golf putter design can include the shaft Cg, the shaft mass, the shaft length, the shaft MOI, the putter-head Cg, the putter-head MOI, the putter-head mass, the putter lean angle, and/or the putter lie angle.

In some embodiments, the initial golf putter design can further include an offset of the shaft relative to the putter-head Cg. In some embodiments, the initial golf putter design can further include a mass of a counterweight, a counterweight Cg, a counterweight MOI, and/or an attachment position of the counterweight on the golf putter. For example, the counterweight can be attached to the handle of the golf putter. The counterweight can be inline or offset from a central axis of the shaft, the length of the shaft measured with respect to the central axis.

In step 1830, the computer determines the integrated torque about the shaft central axis using the first, second, and third input data. The integrated torque can be integrated over the swing path of the golf player.

In step 1840, the computer iteratively modifies the initial putter design. Iteratively modifying the initial putter design can include independently modifying each parameter/variable of the initial golf putter design over a range while keeping the other parameters/variables constant. The range can be predetermined and/or based on a percentage of the parameter's value in the initial putter design. The range can have a predetermined maximum and/or minimum values.

In some embodiments, iteratively modifying the initial putter design can include modifying two or more parameters/variables of the initial golf putter design simultaneously over a range while keeping any other parameters/variables constant.

In step 1850, the computer determines the integrated torque about the shaft central axis for each modified initial putter design. The torque can be integrated over the swing path of the golf player for each modified initial putter design.

In step 1860 (via placeholder A), the computer compares the integrated torques for initial putter design and for each modified initial putter design to determine the minimum integrated torque.

In optional step 1870, the computer produces output data representing a custom golf putter design that corresponds to the minimum integrated torque (e.g., determined in step 1860). The output data can include graphical, text data, and/or output data, which can be provided to the user (e.g., displayed on a display screen coupled to the computer).

Additionally or alternatively, the output data can include manufacturing instructions and/or files that can be used for automated manufacturing machines to construct some or all of the custom golf putter.

Figure 18:
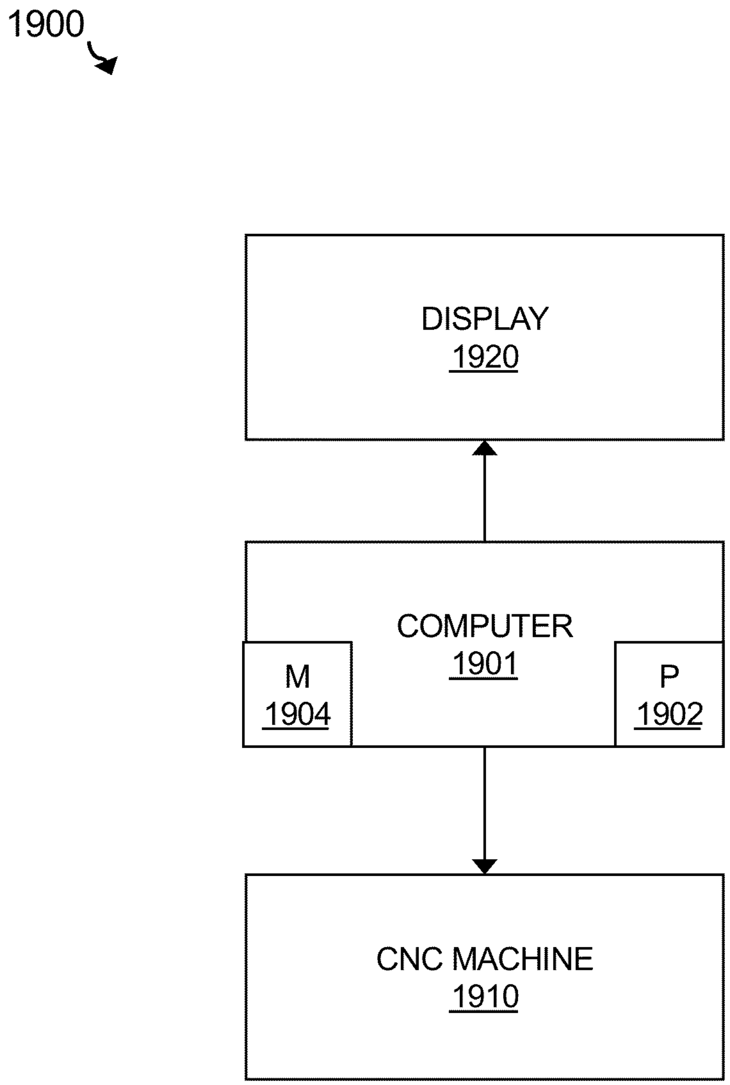
FIG. 18 is a block diagram of a system for manufacturing a custom dynamically balanced golf putter for a golf player according to an embodiment.

In step 1880, a custom dynamically balanced golf putter is manufactured. Some or all of the custom dynamically balanced golf putter can be manufactured using one or more computer numerical control (CNC) machining tools such as a drill, lathe, mill, grinder, router, and/or 3D printer. For example, a CNC machine 1910 can receive computer-readable manufacturing instructions and/or files from a computer 1901 in a system 1900, as illustrated in FIG. 18. The CNC machine 1910 can produce a custom dynamically balanced golf putter, a component of the custom dynamically balanced golf putter, and/or another portion of the custom dynamically balanced golf putter using at least some of the manufacturing instructions and/or files from the computer 1901. The computer 1901 can be the same as computer 1650. The computer 1901 includes one or more hardware-based microprocessors 1902 and computer memory 1904 that includes at least non-transitory memory and optionally includes transitory memory. The non-transitory memory stores computer-readable instructions that can be executed by the microprocessor(s) 1902 to perform one or more tasks as described herein, such as steps 1801-1870 of method 1800. The computer 1901 can include or can be electrically coupled to a display 1920 that can be used to display a user interface and/or the custom/optimized golf putter design.

In some embodiments, the computer 1901 is in electrical communication with two or more CNC machines 1910 that can manufacture two or more portions or components of the custom dynamically balanced golf putter. This aspect is meant generally, as to the custom and optimized design and making of one or more key components of the golf club. Therefore, the method and system can design, optimize and make an entire golf club product, and/or key parts thereof.

Additionally, or alternatively, the custom dynamically balanced golf putter can be manufactured manually and/or using conventional manufacturing techniques guided by the principles and the novel results and useful outputs of the present invention. It is noted that conventional techniques would not be able to achieve the present result as they were based in empirical methods and lacked the ability to effectively analyze the necessary inputs described herein to produce the desired results of this invention. No prior method employed and carried out the steps of the present method, whether on paper or a conventional computer mechanical design program or otherwise. This is evidenced in the absence of properly balanced golf clubs and more notably the absence of optimized and customized golf club products taking into account the player characteristics and dynamics that the present method and system employ.

The following illustrate a non-limiting example of a custom dynamically balanced putter design and a putter apparatus designed and manufactured accordingly. Those skilled in the art understand that the example is merely one instance and that the general technique of the invention can be modified to other examples and many such quantitative equivalents and alternatives are also possible and desired depending on the application at hand. The present system and method can thus have a player setup stage outlined by the previous concepts and using the following exemplary parameters and relations:

$$h_{pivot} = 0.82h_{total}$$

$$d_{stance} = 0.48h_{total}\sin(30^\circ)$$

$$\theta_{swing} = \tan^{-1}\left(h_{pivot}/d_{stance}\right)$$

$$r_{swing} = \sqrt{h_{pivot}^2 + d_{stance}^2}$$

In this example we have the following player related parameters for use in the computer application or method:

| | |
|---|---|
| $h_{total}$ (height) | 5 ft. 10 in., 70 in. |
| $h_{pivot}$ | 57.4 in. |
| $d_{stance}$ | 16.8 in. |
| $\theta_{swing}$ | 73.7° |
| $r_{swing}$ | 59.8 in. |

The first and second input data in steps 1801 and 1802 can include these parameters.

Similarly, we perform a swing setup stage of the procedure, where in an example we use the following model:

$$v_{club,peak} = 0.2d_{putt}$$

$$\theta_{back} = 30\frac{v_{club,peak}}{3}$$

$$\alpha_{vertical} = v^2_{club,peak} \Big/ (2h)$$

$$h_{club\_back} - r_{swing}(1 - \cos(\theta_{back}))$$

$$t_{forward} = \pi\sqrt{r_{swing} * a_{vertical}}$$

And thus, for the swing model we can have the following parameters for use in automating the design of an exemplary putter according to the invention:

| | |
|---|---|
| $d_{putt}$ | 10 ft |
| $V_{club,\ peak}$ | 2 m/s |
| $\theta_{back}$ | 20° |
| h | 0.3 ft |
| $\alpha_{vertical}$ | −21 m/s$^2$ |
| $t_{forward}$ | 0.83 s |

Once again, we use the equations of motion to determine acceleration, velocity and position, which may be machine-generated at a desired periodicity, for example using a sampling period of 1 millisecond or another sampling period.

Figure 19A:
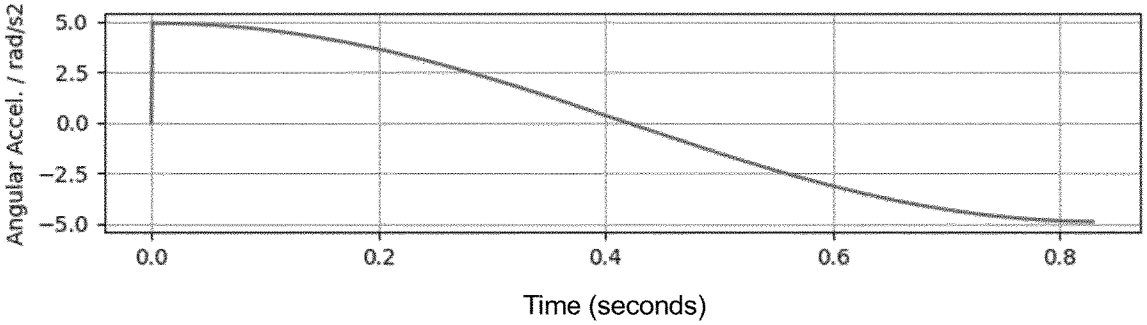
FIGS. 19A-C are graphs of computations for the angle acceleration, angular velocity and angle, respectively for a putter/swing model.
Figure 19B:
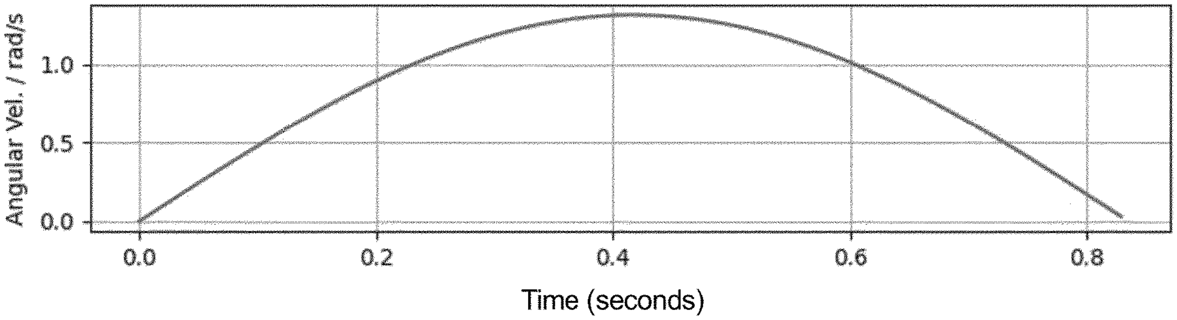
Figure 19C:
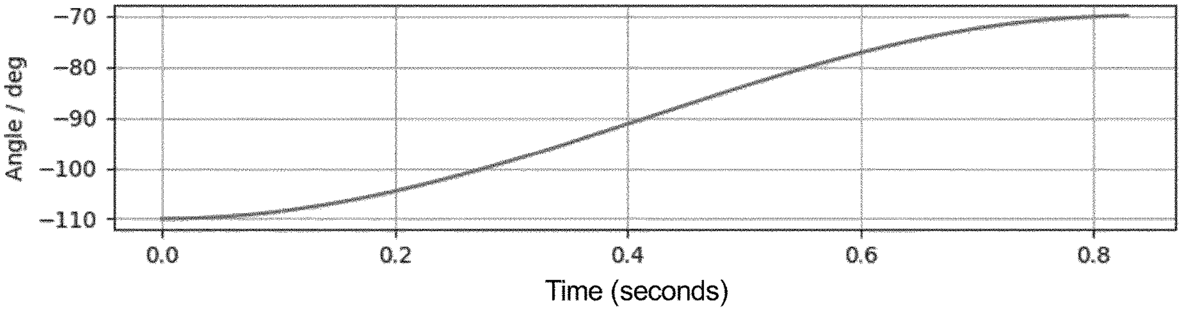

FIGS. 19A, 19B, and 19C shows the results of such computations for the angle acceleration, angular velocity and angle, respectively for the putter/swing model.

The putter model is achieved and computed according to the foregoing equations. For simplicity, in an example, we may consider only the putter shaft and head in our calculations, for example ignoring secondary and non-substantive components such as grip tape, labeling or other manufacturing or ornamental parts. In a particular example, the grip of the putter may be neglected as a component in the calculations. However, this is not necessary, and as shown previously any and all components can also be incorporated and accounted for in a more detailed model without loss of generality. In the simple example of calculating for the shaft and head only of the putter (recognizing that grips and other components would merely add their respective terms to the computations below), we have:

$$\vec{C}_{g,p} = \frac{m_{head}}{m_{head} + m_{shaft}} * \vec{C}_{g,head} + \frac{m_{shaft}}{m_{head} + m_{shaft}} * \vec{C}_{g,shaft} \quad (18)$$

$$R_x = \begin{pmatrix} 1 & 0 & 0 \\ 0 & \cos\theta & -\sin\theta \\ 0 & \sin\theta & \cos\theta \end{pmatrix} \quad (19)$$

-continued $$R_y = \begin{pmatrix} \cos\rho & 0 & \sin\rho \\ 0 & 1 & 0 \\ -\sin\rho & 0 & \cos\rho \end{pmatrix} \quad (20)$$

$$I = RI_{xyz}R^T \quad (21)$$

$$R = R_y(\rho)R_x(\theta) \quad (22)$$

$$I = \begin{pmatrix} I_x & 0 & 0 \\ 0 & I_y & 0 \\ 0 & 0 & I_z \end{pmatrix} \quad (23)$$

And therefore, in an example continuing from the previously stated model of our player and our swing, the method and system will yield for the custom putter design:

| | |
|---|---|
| $\theta_{lie}$ | 70° |
| $\rho_{lean}$ | 0° |
| $m_{head}$ | 350 g |
| $m_{shaft}$ | 260 g |
| $CG_{head}$ | X: 0 m Y: 0 m Z: 0 m |
| $CG_{shaft}$ | X:0 m Y: 0 m Z: 0.53 m |
| $CG_{total}$ | X: 0 m Y:0 m Z: 0.188 m |
| $MOI_{head}$ | X: 0.00033 kg m$^2$ |
| | Y: 0.00082 kg m$^2$ |
| | Z: 0.00052 kg m$^2$ |
| $MOI_{shaft}$ | X: 0.000081 kg m$^2$ |
| | Y: 0.000081 kg m$^2$ |
| | Z: 0.000000096 kg m$^2$ |
| $MOI_{total}$ | 0.000496 kg m$^2$ |

Figure 20A:
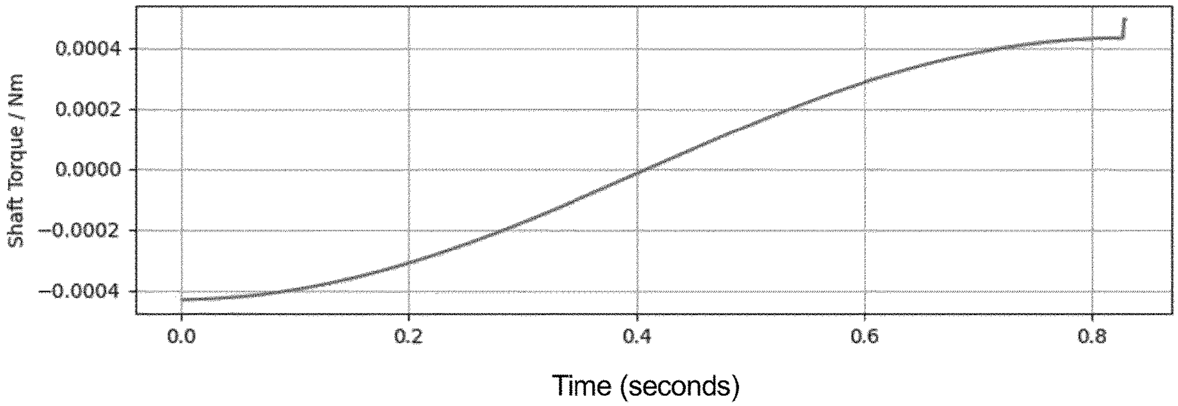
FIGS. 20A and 20B are graphs of computations for the shaft torque and deflection angle, respectively, as a function of time for a custom putter design.
Figure 20B:
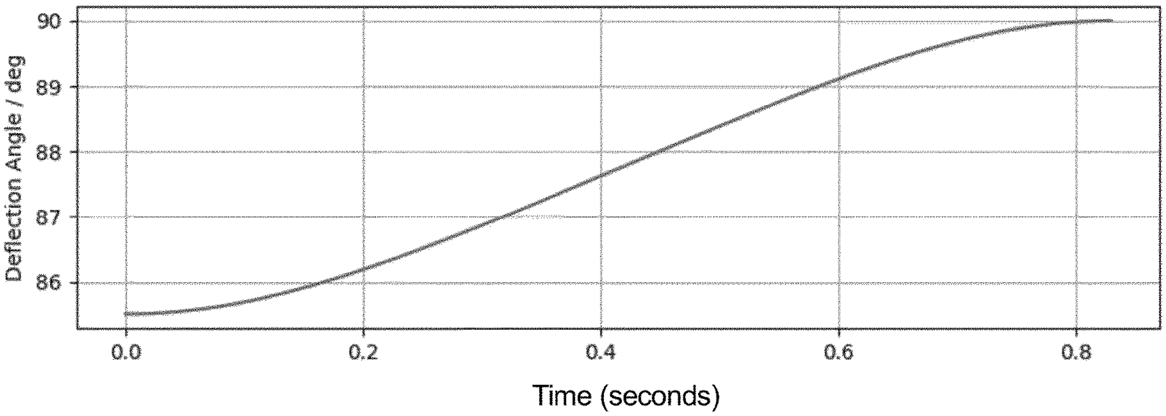

Using our model for the swing dynamics of our putter and player in this example, we obtain the results shown in FIGS. 20A and 20B for the shaft torque and deflection angle, respectively, as a function of time for the custom putter design.

Another benefit and novel aspect of the invention is that it permits for optimization of the shaft offset design and placement in a putter. In an aspect, a gradient decent step is used to find the shaft offset that minimizes the deflection angle through the forward swing.

The gradient decent relies on the understanding that an offset of the shaft away from the putter (+X) will cause the putter head to rotate more (positive deflection) throughout the forward swing. Additionally, an offset away from the face of the putter will increase head rotation (positive deflection) primarily on the follow through of the swing. With these assumptions, the gradient descent process determines the offset locations that minimize deflection angles through the forward swing resulting in an optimally balanced putter design.

Figure 21A:
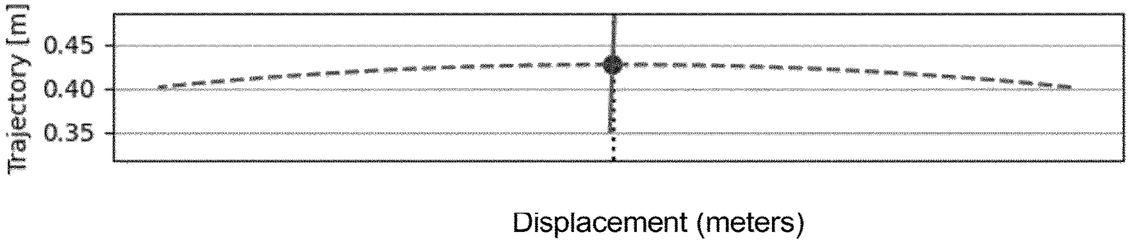
FIGS. 21A and 21B are graphs of computations for an example trajectory and deflection angle for a swing from a putter with no offsets applied such that the shaft connects through the head center of gravity.
Figure 21B:
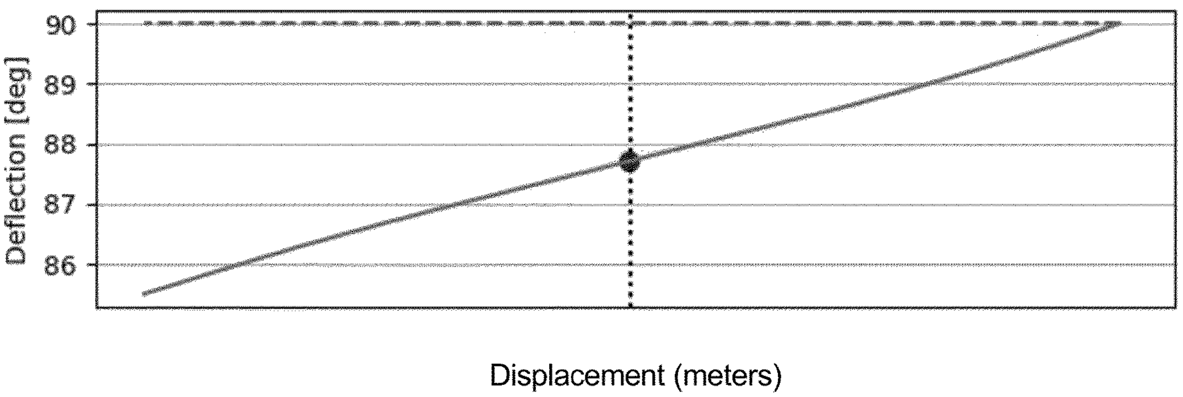

FIGS. 21A and 21B show an example trajectory and deflection angle for a swing from a putter with no offsets applied such that the shaft connects through the head center of gravity. The head of the putter in this illustrative example under rotates through the swing resulting in a deflection angle of approximately 2-3 degrees at the center impact point of the putter head.

Figure 22A:
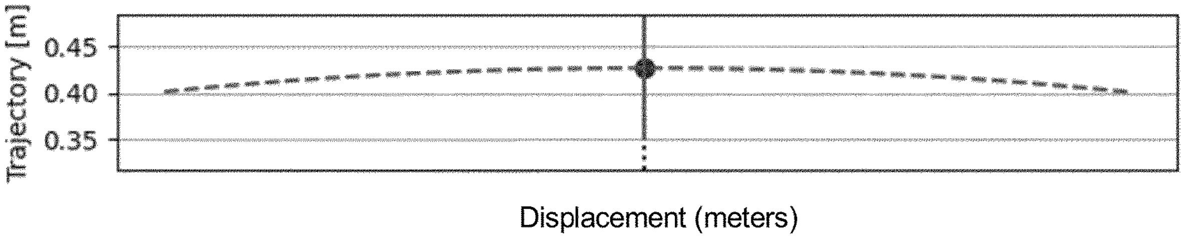
FIGS. 22A and 22B are graphs of computations for an example trajectory and deflection angle for a swing from a putter with a simple optimization to correct for shaft rotation.
Figure 22B:
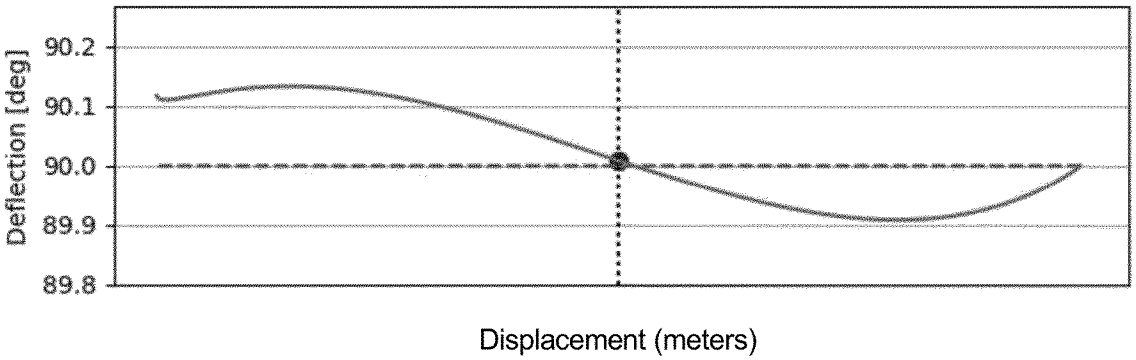

FIGS. 22A and 22B show an example trajectory and deflection angle for a putter with a simple optimization to correct for shaft rotation. The total deflection angle has been minimized at the point of impact and remains less than 0.1 degrees through the forward swing. The offset position in this example was (0.0148", 0.0") for X and Y, respectively.

In FIGS. 21A, 21B, 22A, and 22B the horizontal axis represents forward and back displacement in meters, or the distance through which the putter is swung.

We note that shaft lean (forward lean, backward lean) including no shaft lean can be accommodated by the present models and method and system depending on the needs of the user. Some example putter designs according to the foregoing discussion are presented below and in the corresponding illustrative drawings. Here, a novel golf putter product is shown and this putter is made and determined in its geometry and configuration according to the steps described herein, which can themselves be automated using a processor and programmed instructions that are executed therein. The result is a new and previously-unknown device produced as shown and described that affords a player certain benefits of this putter, especially with regard to correcting physical effects of torque during a golf putter swing and which give an improved result for the player as the device and product are well balanced through the swing and would permit for many or all players an improved score and accuracy in putting.

Figure 23:
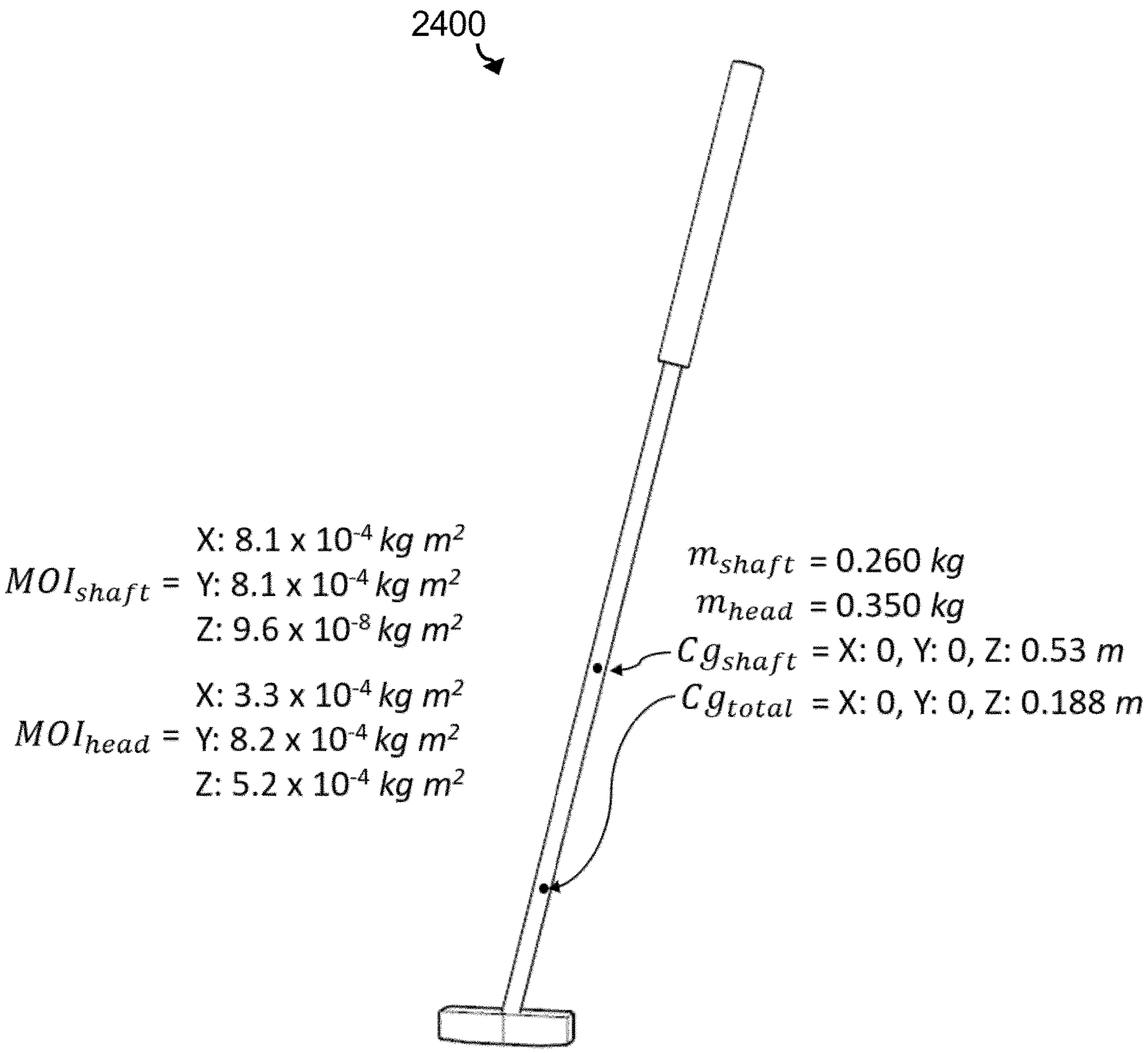
FIG. 23 is an isometric view of a custom dynamically balanced golf putter according to an embodiment.

In the specific example given following the above discussion, a custom dynamically balanced golf putter 2400 is illustrated in FIG. 23. Optimization and use of the input parameters described above can yield by this invention the putter of FIG. 24 having the illustrated moments of inertia (MOI) and masses (m) for the shaft and head as shown with respect to the Cartesian coordinates as used herein.

Figure 24:
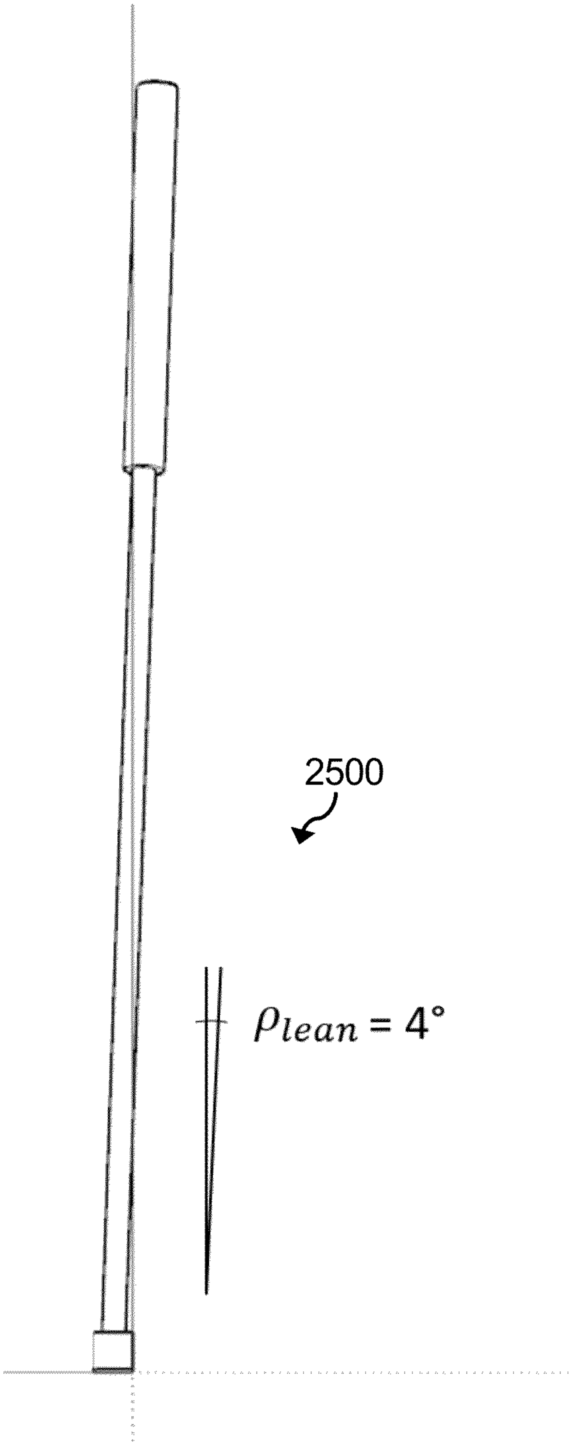
FIG. 24 illustrates an example lean angle of the custom dynamically balanced golf putter illustrated in FIG. 24.

The putter's example lean angle 2500 (here, 4 degrees of forward lean) is shown in FIG. 24, but as mentioned before, the invention is not limited to designs having any particular lean angle, so this lean angle can also be made to be zero (no lean), −4 degrees, or any other reasonable lean amount.

Figure 25:
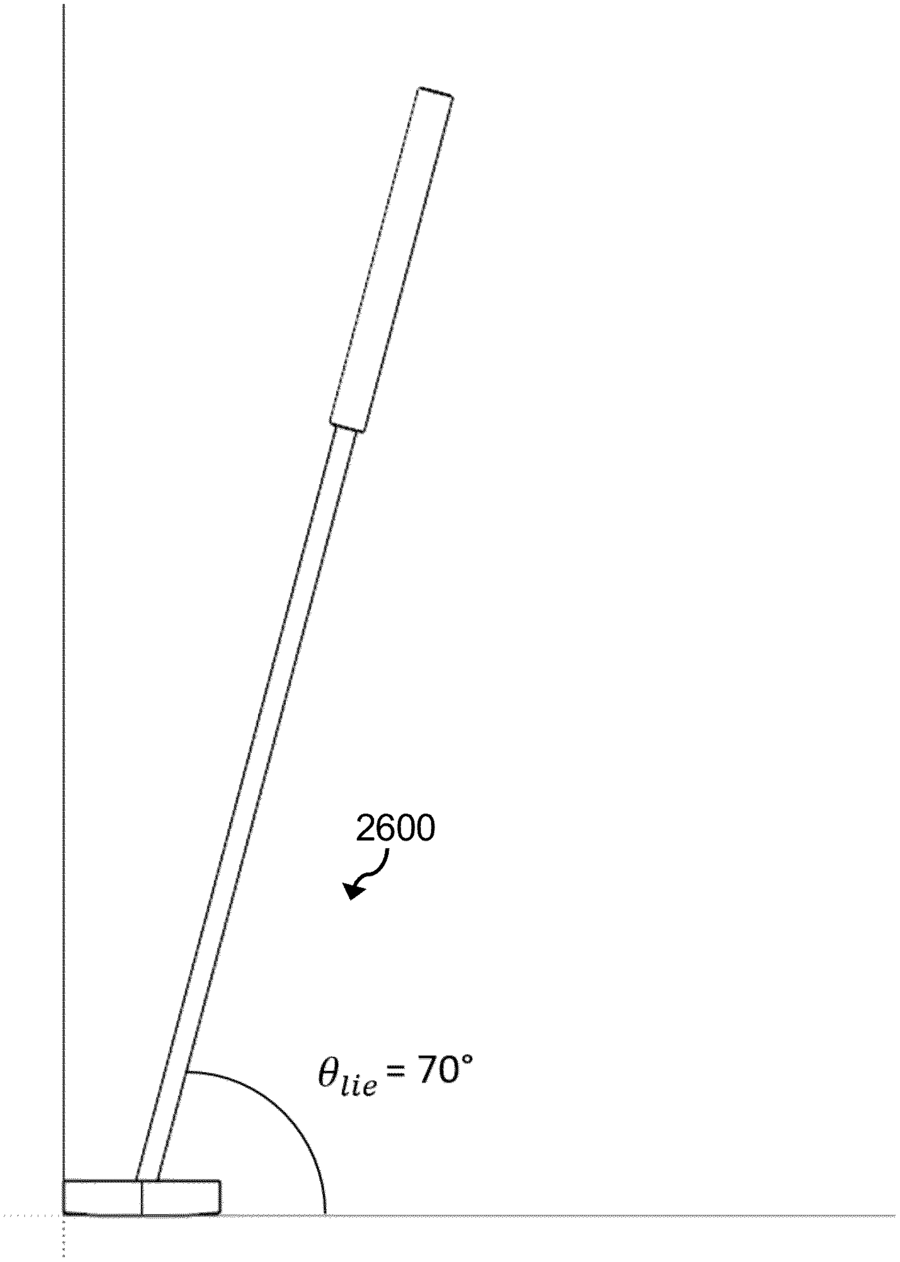
FIG. 25 illustrates an example lie angle of the custom dynamically balanced golf putter illustrated in FIG. 24.

The putter's exemplary lie angle 2600 may be 70 degrees as shown in FIG. 25.

Figure 26:
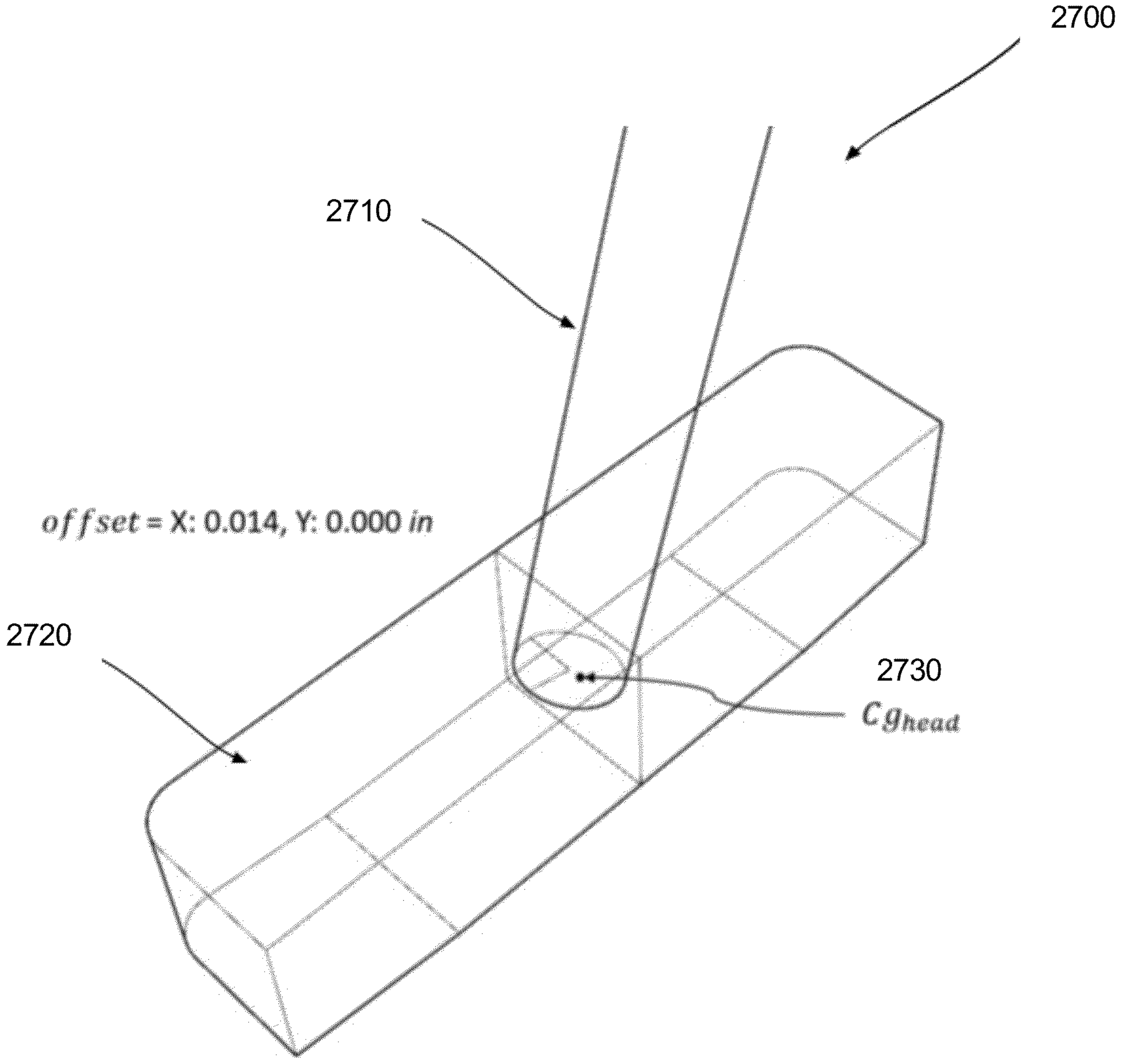
FIG. 26 is a transparent isometric view of a bottom portion of a custom dynamically balanced golf putter in which the shaft is offset from the center of gravity of the head.

FIG. 26 shows an exemplary putter 2700 as described with details of the shaft 2710-to-head 2720 joining region or intersection point. The offset here based on the foregoing example is optimized to be x=0.014 inches and y=0 inches. Note the location of the center of gravity 2730 of the putter head 2720. Putter 2700 can be the same as putter 2400.

The present systems and methods therefore allow for the design and optimization of dynamically balanced golf putters and result in new and useful golf sporting products (e.g., putters, putter shafts, club heads) and computer products such as those accessible using computer applications, mobile computing apps, and distributed software as a service.

An aspect that should be appreciated is that the present method and system enable, inter alia, minimization of the amount of energy required by a golf player to maintain a square club face along the putting path during a putt swing. In an aspect, the invention converts the linear force that a player exerts to move the club forward into a rotational force to rotate the putter about its shaft axis according to the swing path. This may be accomplished by offsetting the club center of gravity in the putter design and geometry relative to the shaft rotation axis. The moment of inertia of the club corresponds then to how difficult it will be to rotate the club about the shaft axis. In an aspect, offsetting the club shaft relative to the club center of gravity can be used to increase said moment of inertia. A larger offset can result in more rotation of the club because, while the moment of inertia increases it does so incrementally with the torque increasing at a greater relative rate. A putter design with minimum moment of inertia is one where the shaft axis runs through the putter's center of gravity resulting in no assisted rotation.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

The present invention is adapted for and comprehends embodiments that include the use of machine learning and/or artificial intelligence methods and components to carry out or improve one or more aspects of the invention. In an example, a computer engine is employed and programmed with instructions for training the computer with a training data set corresponding to one or more players, golf clubs or combinations thereof. The computer system and method so equipped then uses the training set to determine a most likely or most appropriate design parameter or parameters for achieving the present balanced and custom golf clubs. Images or video or sensor signals are examples of input signals that the system may use for training and/or optimization of the present products using machine learning methods and/or artificial intelligence techniques to achieve or improve the same.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method for manufacturing a golf putter, comprising:

receiving, in a computer, first input data describing a putter swing path of a golf player;

receiving, in the computer, second input data describing one or more physical features of the golf player;

receiving, in the computer, third input data describing an initial golf putter design;

determining, with the computer, an initial torque about a shaft central axis for the initial golf putter design using the first, second, and third input data, the initial torque is responsive to the putter swing path of the golf player;

iteratively modifying, with the computer, the initial golf putter design to provide a plurality of modified golf putter designs;

determining, with the computer, modified torques about the shaft central axis for respective modified golf putter designs, each modified torque is responsive to the putter swing path of the golf player;

comparing, with the computer, the initial torque and the respective modified torques to determine a custom golf putter design having a minimum torque over the putter swing path of the golf player; and manufacturing the golf putter using the custom golf putter design.

2. The method of claim 1, further comprising inputting at least one of the modified golf putter designs to a computer numerical control (CNC) machining tool to automatically manufacture at least a component of the custom golf putter.

3. The method of claim 2, wherein the CNC machining tool comprises a three-dimensional printer.

4. The method of claim 1, further comprising:

placing one or more sensors on a sample golf putter; and collecting swing path data with the sensors as the golf player swings the sample golf putter, wherein the first input data includes the swing path data.

5. The method of claim 4, wherein the one or more sensors include one or more inertial sensors, one or more gyroscopes, and/or one or more accelerometers.

6. The method of claim 1, further comprising:

capturing images of the golf player swinging a sample golf putter, the images captured using one or more cameras; and determining, with the computer, the putter swing path based on the images.

7. The method of claim 1, wherein the initial golf putter design includes a plurality of putter design parameters including:

a center of gravity of a putter shaft, a mass of the putter shaft, a length of the putter shaft, the length extending along the shaft central axis, a lean angle of an initial golf putter, a lie angle of the initial golf putter, a center of gravity of a putter head, the putter head attached to the putter shaft, and a mass of the putter head.

8. The method of claim 7, wherein the initial golf putter design and/or at least one of the modified golf putter designs include(s) a mass of a counterweight and a center of gravity of the counterweight, the counterweight attached at or above a handle of the putter shaft.

9. The method of claim 8, wherein the putter design parameters include a first offset location of the counterweight with respect to the shaft central axis.

10. The method of claim 9, wherein the putter design parameters include a second offset between the shaft central axis and the center of gravity of the putter head.

11. The method of claim 10, wherein the step of iteratively modifying the initial golf putter design includes iteratively modifying each putter design parameter over a respective predetermined range.

12. The method of claim 1, wherein the one or more physical features of the player include:

a height of the golf player, and a stance distance of the golf player.

13. The method of claim 12, wherein the putter swing path is modeled using the height and the stance distance of the golf player.

14. The method of claim 1, further comprising outputting, on a display screen electrically coupled to the computer, output data representing the custom golf putter design, the custom golf putter design having the minimum torque for the golf player.

15. A system for manufacturing a golf putter, comprising:

a computer having a microprocessor and non-transitory memory operatively coupled to the microprocessor, the non-transitory memory storing computer-readable instructions that, when executed by the microprocessor, cause the microprocessor to:

determine an initial torque about a shaft central axis for an initial golf putter design using the first, second, and third input data, the initial torque is responsive to the putter swing path of the golf player, wherein:

the first input data describes a putter swing path of a golf player;

the second input data describes one or more physical features of the golf player;

the third input data describes the initial golf putter design;

iteratively modify the initial golf putter design to provide a plurality of modified golf putter designs;

determine modified torques about the shaft central axis for respective modified golf putter designs, each modified torque is responsive to the putter swing path of the golf player; and compare the initial torque and the respective modified torques to determine a custom golf putter design having a minimum torque; and a computer numerical control (CNC) machining tool in electrical communication with the computer, the CNC machining tool configured to automatically manufacture at least a component of the golf putter using at least a portion of the custom golf putter design.

16. The system of claim 15, wherein the CNC machining tool comprises a drill, a lathe, a mill, a grinder, a router, or a 3D printer.

17. The method of claim 11, wherein the predetermined range has a predetermined maximum and minimum values.

18. The method of claim 7, wherein the step of iteratively modifying the initial golf putter design includes independently modifying each parameter of the initial golf putter design over a range while keeping the other parameters constant.

19. The method of claim 1, further comprising:

training, with the computer, a training data set corresponding to one or more players and golf clubs, the training data set including images, video and sensor signals, using machine learning methods and/or artificial intelligence techniques;

determining, with the computer, modified torques about the shaft central axis for respective modified golf putter designs, each modified torque determined responsive to the putter swing path of the golf player and the training data set;

comparing, with the computer, the initial torque and the respective modified torques responsive to the training data set to determine a custom golf putter design having a minimum torque over the putter swing path of the golf player; and manufacturing the golf putter using the golf putter design.

20. The method of claim 1, wherein a desired motion of the putter along the putter swing path can be defined by time and position values that in turn can be used to calculate a force applied on the putter.

21. The method of claim 20, wherein the force on the putter is back-calculated by the desired motion of the putter.

22. The method of claim 21, wherein the force on the putter is used to calculate a torque on the putter.

23. The method of claim 22, wherein the torque on the putter is a product of a moment of inertia of the putter and an angular acceleration of the putter.

24. A system for manufacturing a golf putter, comprising:

a computer having a microprocessor and non-transitory memory operatively coupled to the microprocessor, the non-transitory memory storing computer-readable instructions that, when executed by the microprocessor, cause the microprocessor to:

iteratively generate a golf putter design to provide a plurality of golf putter designs using first data including a putter swing path of a golf player, second data including one or more physical features of the golf player, third data including a base golf putter design, and an initial torque about a shaft central axis of the golf putter responsive to the putter swing path of the golf player;

determine modified torques about the shaft central axis for respective modified golf putter designs, each modified torque determined responsive to the putter swing path of the golf player; and process the respective modified torques to determine a custom golf putter design having a minimum torque; and a computer numerical control (CNC) machining tool in electrical communication with the computer, the CNC machining tool configured to automatically manufacture at least a component of the golf putter using at least a portion of the custom golf putter design.

25. The system of claim 24, wherein a desired motion of the putter along the putter swing path can be defined by time and position values that in turn can be used to calculate a force applied on the putter.

26. The system of claim 25, wherein the force on the putter is back-calculated by the desired motion of the putter.

27. The system of claim 26, wherein the force on the putter is used to calculate a torque on the putter.

28. The system of claim 27, wherein the torque on the putter is a product of a moment of inertia of the putter and an angular acceleration of the putter.

29. A method for manufacturing a torque balanced golf putter, comprising:

receiving at least one characteristic including at least one player characteristic or at least one putter characteristic;

determining a rotation or torque about a shaft central axis responsive to an initial golf putter configuration and the at least one characteristic over a putter swing path when the golf putter is swung;

modifying the initial golf putter configuration responsive to the said determining the rotation or the torque;

determining a modified rotation or torque about the shaft central axis responsive to the modified golf putter configuration over the putter swing path when the golf putter is swung;

determining another rotation or torque about the shaft central axis over the putter swing path to determine another modified golf putter configuration having a minimum rotation or torque about the shaft central axis over the putter swing path when the golf putter is swung; and manufacturing the torque balanced golf putter using the another modified golf putter configuration.

30. The method of claim 29, wherein the at least one player characteristic includes at least one of: a height of the golf player or a stance distance of the player.

31. The method of claim 30, wherein the putter swing path is determined responsive to the at least one of: the height or the stance distance of the player.

32. A method for manufacturing a torque-balanced golf putter, comprising:

receiving at least one characteristic including at least one player characteristic or at least one putter characteristic;

determining an initial torque about a shaft central axis for an initial golf putter configuration over a putter swing path based on the at least one characteristic;

modifying the initial golf putter configuration to provide at least one modified golf putter configuration;

determining at least one modified torque about the shaft central axis for the at least one modified golf putter configuration over the putter swing path;

comparing the initial torque and the at least one modified torque to determine a selected golf putter configuration having a minimum torque about the shaft central axis over the putter swing path; and manufacturing the torque-balanced golf putter using the selected golf putter configuration.

33. The method of claim 32, wherein the at least one characteristic includes at least one of a height of a golf player, a stance distance of the golf player, or a putter swing path of the golf player.

34. The method of claim 32, wherein the initial golf putter configuration includes one or more putter design parameters comprising at least one of a mass of a putter head, a center of gravity of the putter head, a mass of a putter shaft, a length of the putter shaft, a lie angle, or a lean angle.

35. The method of claim 32, wherein modifying the initial golf putter configuration further comprises varying one or more putter design parameters over respective predetermined ranges to provide the plurality of modified golf putter configurations.

36. The method of claim 32, wherein a predetermined motion of the putter along the putter swing path defines a force and corresponding torque applied to the putter.

37. The method of claim 36, wherein the torque on the putter is a product of a moment of inertia of the putter and an angular acceleration of the putter used to determine at least one of: the initial torque or the modified torque.

* * * * *